US012210792B2

(12) United States Patent
Quan et al.

(10) Patent No.: US 12,210,792 B2
(45) Date of Patent: Jan. 28, 2025

(54) ELECTRONIC DEVICE DISPLAYING CONTENT, OPERATING METHOD OF THEREOF, AND HEAD MOUNTED DEVICE

(71) Applicant: Samsung Electronics Co., Ltd., Suwon-si (KR)

(72) Inventors: Hoang Minh Quan, Bac Ninh (VN); Vu Van Dieu, Bac Ninh (VN); Nguyen Dang Tung, Bac Ninh (VN); Nong Thi Thu Ha, Bac Ninh (VN); Tong Ngan Ha, Bac Ninh (VN); Tran Thi Ngoc Hoa, Bac Ninh (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/392,378

(22) Filed: Dec. 21, 2023

(65) Prior Publication Data
US 2024/0211196 A1    Jun. 27, 2024

(30) Foreign Application Priority Data
Dec. 23, 2022  (KR) ........................ 10-2022-0182971

(51) Int. Cl.
*G06F 3/14*    (2006.01)
*G02B 27/01*   (2006.01)
(Continued)

(52) U.S. Cl.
CPC ......... *G06F 3/1431* (2013.01); *G02B 27/017* (2013.01); *G06F 3/012* (2013.01); *G06F 21/84* (2013.01)

(58) Field of Classification Search
CPC ........ G06F 3/1431; G06F 3/012; G06F 21/84; G06F 3/011; G06F 3/04842; G06F 1/163;
(Continued)

(56) References Cited

U.S. PATENT DOCUMENTS 10,685,488 B1 *   6/2020  Kumar .................. A61H 23/04
2014/0071539 A1 * 3/2014  Gao .................... G02B 27/0172
                                                        359/737
(Continued)

FOREIGN PATENT DOCUMENTS

EP         03223061 B1    10/2019
JP         2022-002103 A   1/2022
KR      10-2016-005388 A   1/2016

*Primary Examiner* — Andrew Sasinowski
(74) *Attorney, Agent, or Firm* — Jefferson IP Law, LLP

(57) ABSTRACT

An electronic device is provided. The electronic device includes a communication interface, a display, and at least one processor. The at least one processor is configured to establish a communication connection to a head-mounted device according to a designated communication scheme through the communication interface, identify, based on a first content (C1) to be displayed on the display, a second content (C2) to be displayed in the head-mounted device, display, on the display based on identifying of the second content (C2), first display data in which at least part of the identified second content (C2) in the first content (C1) is corrected, and transmit second display data related to the identified second content (C2) to the head-mounted device through the communication interface.

20 Claims, 25 Drawing Sheets

(51) Int. Cl.
*G06F 3/01* (2006.01)
*G06F 21/84* (2013.01)

(58) Field of Classification Search
CPC ............... G06F 3/0481; G02B 27/017; G02B 2027/014; G02B 2027/0178; G06T 19/003; G06T 19/006
See application file for complete search history.

(56) References Cited

U.S. PATENT DOCUMENTS

| | | |
|---|---|---|
| 2015/0062159 A1 | 3/2015 | Hildreth et al. |
| 2016/0349509 A1* | 12/2016 | Lanier ..................... G06F 3/012 |
| 2018/0020010 A1 | 1/2018 | Bhardwaj |
| 2019/0340815 A1 | 11/2019 | Yildiz et al. |

* cited by examiner

ELECTRONIC DEVICE DISPLAYING CONTENT, OPERATING METHOD OF THEREOF, AND HEAD MOUNTED DEVICE

CROSS-REFERENCE TO RELATED APPLICATION(S)

This application is based on and claims priority under 35 U.S.C. § 119(a) of a Korean patent application number 10-2022-0182971, filed on Dec. 23, 2022, in the Korean Intellectual Property Office, the disclosure of which is incorporated by reference herein in its entirety.

BACKGROUND

1. Field

The disclosure relates to an electronic device for providing a visual content to a user, an operation method thereof, and a head-mounted device.

2. Description of Related Art

As technology of a portable terminal device has developed, the portable terminal device that is easily carried has been frequently used in public places, such as public transportation. As a user uses a portable terminal device in public places, a visual content displayed on a display may be easily tracked or recorded via persons around the user or closed-circuit television (CCTV).

Specifically, as the size of a display is gradually increased and resolution is increased in order to provide the visual content with high quality, it is more difficult to defend security from the outside.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for providing a visual content to a user, an operation method thereof, and a head-mounted device.

Additional aspects will be set forth in part in the description which follows and, in part, will be apparent from the description, or may be learned by practice of the presented embodiments.

In accordance with an aspect of the disclosure, an electronic device is provided. The electronic device includes a communication interface, a display, and at least one processor. The at least one processor is configured to establish a communication connection to a head-mounted device according to a designated communication scheme through the communication interface, identify, based on a first content to be displayed on the display, a second content to be displayed in the head-mounted device, display, on the display based on identifying of the second content, first display data in which at least part of the identified second content in the first content is corrected, and transmit second display data related to the identified second content to the head-mounted device through the communication interface.

In accordance with another aspect of the disclosure, a method of operating the electronic device is provided. The method includes establishing a communication connection to a head-mounted device according to a designated communication scheme via a communication interface, identifying, based on a first content to be displayed on a display, a second content to be displayed in the head-mounted device, displaying, on the display based on identifying of the second content, first display data in which at least part of the identified second content in the first content is corrected and, transmitting second display data related to the identified second content to the head-mounted device through the communication interface.

In accordance with another aspect of the disclosure, at least one non-transitory computer-readable recording medium that stores one or more programs is provided. The at least one non-transitory computer-readable recording medium includes establishing, based on execution of an application, a communication connection to a head-mounted device according to a designated communication scheme via a communication interface, identifying, based on a first content to be displayed on a display, a second content to be displayed in the head-mounted device, displaying, on the display based on identifying of the second content, first display data in which at least part of the identified second content in the first content is corrected, and transmitting second display data related to the identified second content to the head-mounted device through the communication interface.

In accordance with another aspect of the disclosure, a head-mounted device is provided. The head-mounted device includes a communication interface, a display, and at least one processor. The at least one processor is configured to establish a communication connection to an electronic device according to a designated communication scheme through the communication interface, receive second display data related to a second content from the electronic device through the communication interface, and display, on the display, the received second display data at a location corresponding to at least part of the electronic device.

In accordance with another aspect of the disclosure, a method of operating the head-mounted device is provided. The method includes establishing a communication connection to an electronic device according to a designated communication scheme via a communication interface, receiving second display data related to a second content from the electronic device through the communication interface, and displaying, via a display, the received second display data at a location corresponding to at least part of the electronic device.

In accordance with another aspect of the disclosure, at least one non-transitory computer-readable recording medium that stores one or more programs is provided. The at least one non-transitory computer-readable recording medium includes establishing, based on execution of an application, a communication connection to an electronic device according to a designated communication scheme via a communication interface, receiving second display data related to a second content from the electronic device through the communication interface, and displaying, on the display, the received second display data at a location corresponding to at least part of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
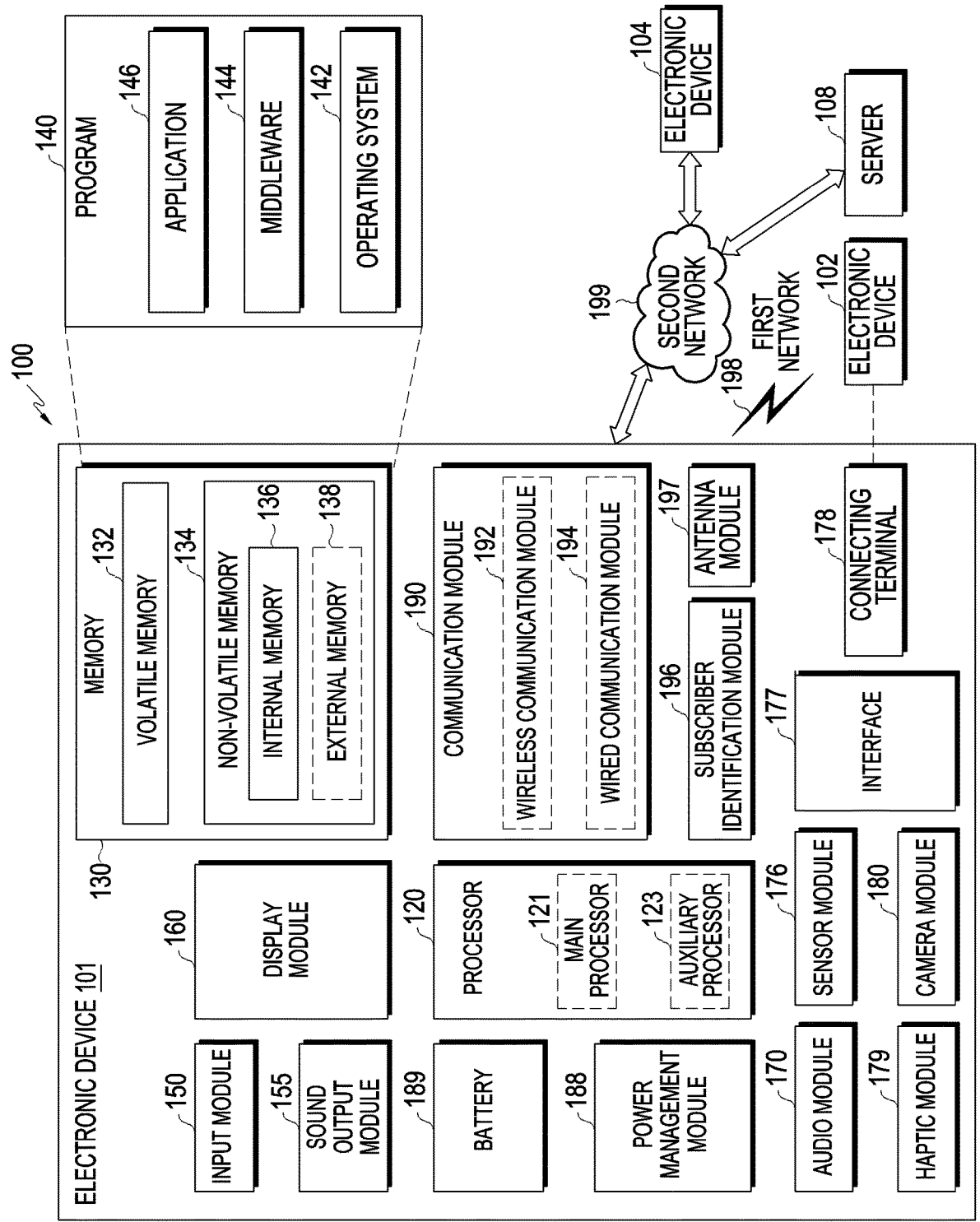
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
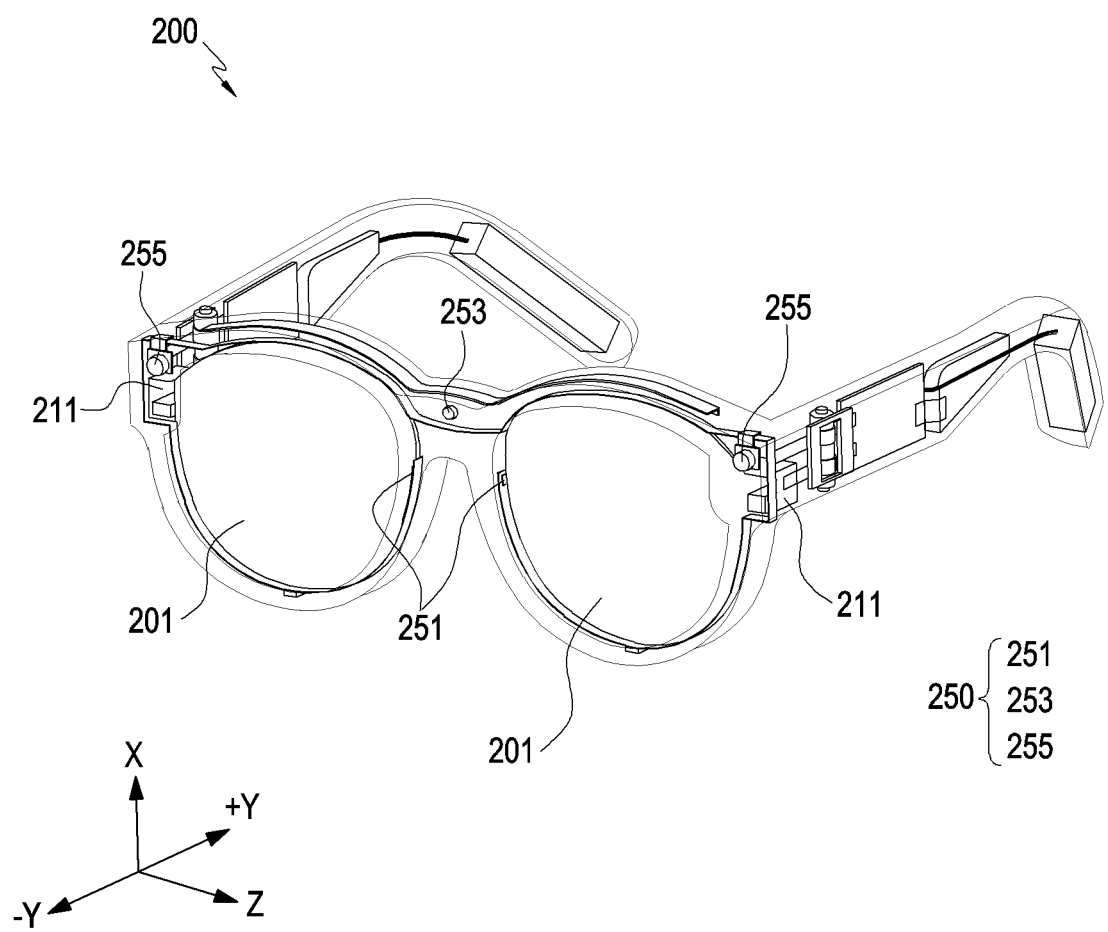
FIG. 2 is a perspective view illustrating an internal configuration of a wearable electronic device according to an embodiment of the disclosure.

FIG. 2 is a perspective view illustrating an internal configuration of a wearable electronic device according to an embodiment of the disclosure.

Referring to FIG. 2, a wearable electronic device 200 according to an embodiment of the disclosure may include at least one of an optical output module 211, a display member 201, and a camera module 250.

According to an embodiment of the disclosure, the optical output module 211 may include a light source capable of outputting an image and a lens that guides an image to the display member 201. According to an embodiment of the disclosure, the optical output module 211 may include at least one of a liquid crystal display (LCD), a digital mirror device (DMD), a liquid crystal on silicon (LCoS), an organic light emitting diode (OLED), or a micro light emitting diode (micro LED).

According to an embodiment of the disclosure, the display member 201 may include an optical waveguide (e.g., a waveguide). According to an embodiment of the disclosure, an image output from the optical output module 211, which is incident to one end of an optical waveguide, is propagated in the optical waveguide and is provided to a user. According to an embodiment of the disclosure, an optical waveguide may include at least one among at least one diffractive element (e.g., a diffractive optical element (DOE), a holographic optical element (HOE)) or a reflective element (e.g., a reflection mirror). For example, an optical waveguide may guide an image output from the optical output module 211 to the eyes of a user by using at least one of diffractive element or a reflective element.

According to an embodiment of the disclosure, the camera module 250 may shoot a still image and/or a video. According to an embodiment of the disclosure, the camera module 250 may be disposed in a lens frame, and may be disposed around the display member 201.

According to an embodiment of the disclosure, a first camera module 251 may shoot and/or recognize the trajectory of an eye (e.g., pupil, iris) or a line of sight of a user. According to an embodiment of the disclosure, the first camera module 251 may periodically or aperiodically transmit, to a processor (e.g., the processor 120 of FIG. 1), information (e.g., trajectory information) related to the trajectory of the line of sight or the eye of a user.

According to an embodiment of the disclosure, a second camera module 253 may shoot an image of the outside.

According to an embodiment of the disclosure, a third camera module 255 may be used for detecting a hand, performing tracking, and recognizing a user gesture (e.g., a movement of a hand). The third camera module 255 according to an embodiment of the disclosure may be used for head tracking in 3 degrees of freedom (3DoF) or 6DoF, recognizing a location (a space, an environment), and/or recognizing a movement. The second camera module 253 may be used for detecting a hand, performing tracking, and recognizing a user gesture according to an embodiment of the disclosure. According to an embodiment of the disclosure, at least one of the first camera module 251 to the third camera module 255 may be replaced with at least one sensor module (e.g., a light detection and ranging (LiDAR) sensor). For example, a sensor module may include at least one of a vertical cavity surface emitting laser (VCSEL), an infrared ray sensor, and/or a photodiode.

Figure 3A:
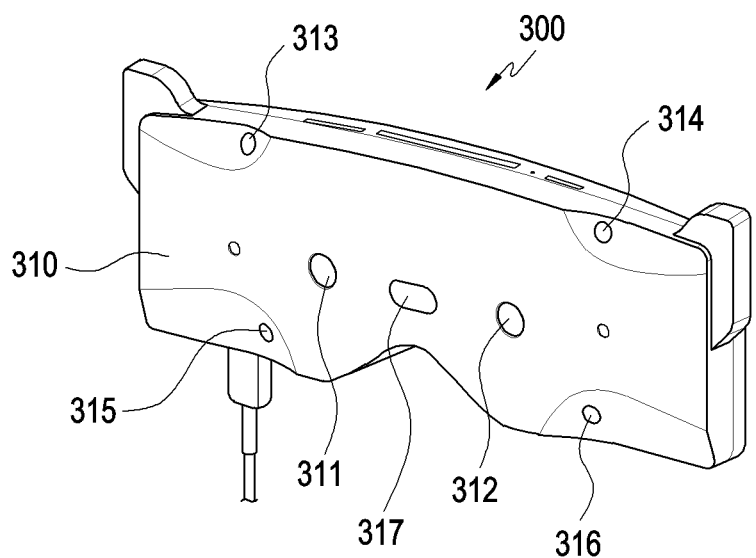
FIG. 3A is a diagram illustrating a front side of a wearable electronic device according to an embodiment of the disclosure.
Figure 3B:
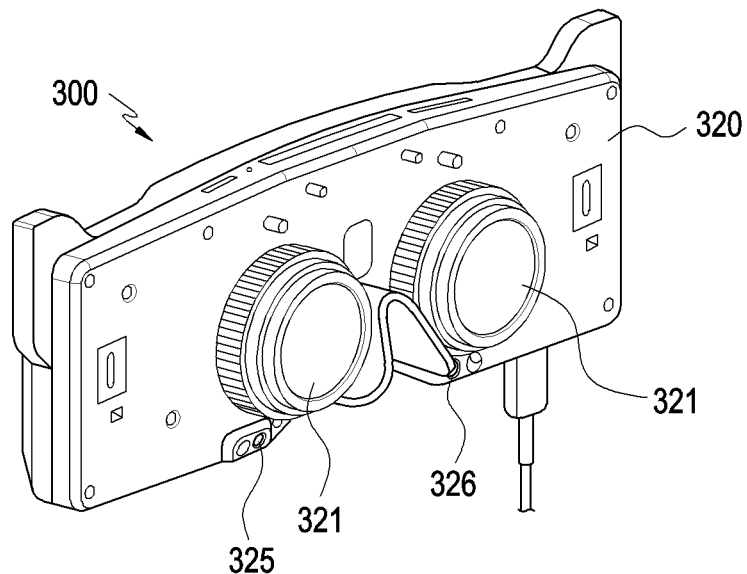
FIG. 3B is a diagram illustrating a rear side of a wearable electronic device according to an embodiment of the disclosure.

FIG. 3A is a diagram illustrating a front side of a wearable electronic device according to an embodiment of the disclosure, and FIG. 3B is a diagram illustrating a rear side of a wearable electronic device according to an embodiment of the disclosure.

Referring to FIGS. 3A and 3B, according to an embodiment of the disclosure, camera modules 311, 312, 313, 314, 315, and 316 and/or a depth sensor 317 may be disposed in a first side 310 of a housing in order to obtain information related to an environment around a wearable electronic device 300.

According to an embodiment of the disclosure, camera modules 311 and 312 may obtain an image related to an environment around a wearable electronic device.

According to an embodiment of the disclosure, camera modules 313, 314, 315, and 316 may obtain an image in the state in which a wearable electronic device is worn by a user. The camera modules 313, 314, 315, and 316 may be used to detect a hand, to perform tracking, and to recognize a user gesture (e.g., a movement of a hand). The camera modules 313, 314, 315, and 316 may be used for head tracking in 3DoF or 6DoF, recognizing a location (a space, an environment), and/or recognizing a movement. According to an embodiment of the disclosure, the camera modules 311 and 312 may be used for detecting a hand, tracking, and a user gesture.

According to an embodiment of the disclosure, a depth sensor 317 may be configured to transmit a signal and to receive a signal reflected from a subject, and may be used for identifying the distance to an object, such as a time of flight (TOF). As an alternative or additional measure of the depth sensor 217, the camera modules 213, 214, 215, and 216 may identify the distance to an object.

According to an embodiment of the disclosure, face recognition camera modules 325 and 326 and/or a display 321 (and/or a lens) may be disposed in a second side 320 of the housing.

According to an embodiment of the disclosure, the face recognition camera modules 325 and 326 adjacent to a display may be used for recognizing the face of a user, or may recognize and/or track both eyes of a user.

According to an embodiment of the disclosure, the display 321 (and/or a lens) may be disposed in the second side 320 of the wearable electronic device 300. According to an embodiment of the disclosure, the wearable electronic device 300 may not include camera modules 315 and 316 among the plurality of camera modules 313, 314, 315, and 316. Although not illustrated in FIGS. 3A and 3B, the wearable electronic device 300 may further include at least one component element among the component elements illustrated in FIG. 0.2.

As described above, according to an embodiment of the disclosure, the wearable electronic device 300 may have a form factor to be worn on the head of a user. The wearable electronic device 300 may further include a strap and/or a wearing member to fix itself on a body part of a user. The wearable electronic device 300 may provide a user environment based on an augmented reality, a virtual reality, and/or a mixed reality in the state in which the wearable electronic device 300 is worn on the head of the user.

Figure 4:
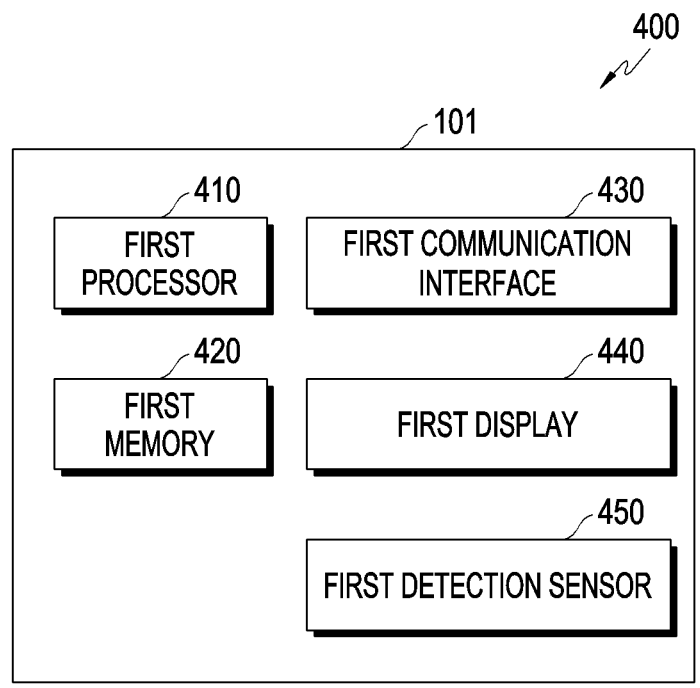
FIG. 4 is a block diagram illustrating an electronic device according to an embodiment of the disclosure.

FIG. 4 is a block diagram 400 of an electronic device according to an embodiment of the disclosure.

Referring to FIG. 4, the electronic device 101 according to an embodiment of the disclosure may include a first processor 410 (e.g., the processor 120 of FIG. 1), a first memory 420 (e.g., the memory 130 of FIG. 1), a first communication interface 430 (e.g., the communication module 190 of FIG. 1), a first display 440 (e.g., the display module 160 of FIG. 1), and/or a first detection sensor 450 (e.g., the sensor module 176). The electronic device 101 according to an embodiment may include the whole or a part of the configuration included in the electronic device 101 of FIG. 1.

According to an embodiment of the disclosure, the first processor 410 may control at least one other component element (e.g., a hardware or software component element) of the electronic device connected to the first processor 410 by operating software (e.g., a program), and may perform various data processing and operations. According to an embodiment of the disclosure, the first processor 410 may store, in the first memory 420, a command or data received from another component element, may process the command or data stored in the first memory 420, and may store resultant data in the first memory 420.

Figure 5:
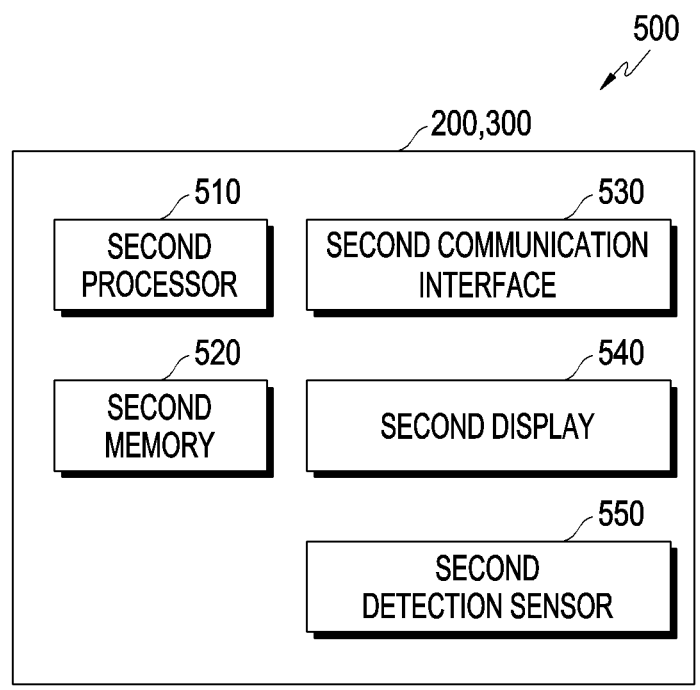
FIG. 5 is a block diagram illustrating a head-mounted device according to an embodiment of the disclosure.

According to an embodiment of the disclosure, the first communication interface 430 (e.g., the communication module 190 of FIG. 1) may establish a wired communication channel or a wireless communication channel with an external electronic device (e.g., the external electronic device 102, the external electronic device 104, or the server 108 of FIG. 1, or the head-mounted device 200 and 300 of FIG. 5), and may establish a communication connection via the established communication channel. According to an embodiment of the disclosure, the first communication interface 430 may perform transmitting or receiving of data and/or a signal with an external electronic device to which a communication connection is established. According to an embodiment of the disclosure, a designated communication scheme may be a short-range communication network, such as Bluetooth, wireless fidelity (Wi-Fi) direct, or infrared data association (IrDA), or may be a long-range communication network, such as a legacy cellular network, the 5G network, a next generation communication network, the Internet, or a computer network (LAN or WAN).

According to an embodiment of the disclosure, the first display 440 may visually provide information to the outside (e.g., a user) of the electronic device 101. According to an embodiment of the disclosure, the first display 440 may be a display module including a display panel, a hologram device, or a projector, and a control circuit to control a corresponding device, and may include a touch sensor configured to detect a touch or a pressure sensor configured to measure the intensity of force incurred by the touch.

According to an embodiment of the disclosure, the first detection sensor 450 may detect a location, an environment, a brightness, or a gradient of the electronic device 101. According to an embodiment of the disclosure, the first detection sensor 450 may detect, based on a global positioning system (GPS) or a motion sensor (e.g., an acceleration sensor), the location of the electronic device 101, and may obtain, based on the detected location, data related to a place where the electronic device 101 is located.

According to an embodiment of the disclosure, the first detection sensor 450 may obtain data related to an environment around the electronic device 101, and, based on the obtained data related to the environment around the electronic device 101, the electronic device 101 may identify whether the environment around the electronic device 101 is a public environment. For example, the first detection sensor 450 may detect sound or electric waves from a surrounding environment, and, based on the detected sound or electric waves, the electronic device 101 may identify whether the environment around the electronic device 101 is a public environment.

According to an embodiment of the disclosure, the first detection sensor 450 may detect an ambient brightness of the electronic device 101. For example, the first detection sensor 450 may include an illuminance sensor (photo resistor) for measuring the density of luminous flux.

According to an embodiment of the disclosure, the first detection sensor 450 may detect a gradient of the electronic device 101. For example, the first detection sensor 450 may include at least one among an acceleration sensor or gyroscope, a vertical cavity surface emitting laser (VCSEL), an infrared ray sensor, a LiDAR sensor, and/or a photodiode, which may be used for a gradient of 3 degrees of freedom (DoF) or 6DoF, recognizing a location (a space, an environment), and/or recognizing a movement.

FIG. 5 is a block diagram 500 of a head-mounted device according to an embodiment of the disclosure.

Referring to FIG. 5, a head-mounted device (e.g., the wearable electronic device 200 of FIG. 2 and the wearable electronic device 300 of FIG. 3A) according to an embodiment may include a second processor 510 (e.g., the processor 120 of FIG. 1), a second memory 520 (e.g., the memory 130 of FIG. 1), a second communication interface 530 (e.g., the communication module 190 of FIG. 1), a second display 540 (e.g., the display module 160 of FIG. 1), and/or a second detection sensor 550 (e.g., the sensor module 176). The head-mounted device 200 and 300 according to an embodiment may include the whole or part of the configuration included in the electronic device 101 of FIG. 1, the wearable electronic device 200 of FIG. 2 and/or the wearable electronic device 300 of FIG. 3A.

According to an embodiment of the disclosure, the second processor 510 may control at least one other component element (e.g., a hardware or software component element) of the head-mounted device 200 and 300 connected to the second processor 510 by operating software (e.g., a program), and may perform various data processing and operations. According to an embodiment of the disclosure, the second processor 510 may store, in the second memory 520, a command or data received from another component element, may process the command or data stored in the second memory 520, and may store resultant data in the second memory 520.

According to an embodiment of the disclosure, the second communication interface 530 may establish a wired communication channel or a wireless communication channel with an electronic device (e.g., the electronic device 101 of FIG. 4), and may establish a communication connection via the established communication channel. According to an embodiment of the disclosure, the second communication interface 530 may perform transmitting or receiving of data and/or a signal with the electronic device 101 to which a communication connection is established. According to an embodiment of the disclosure, a designated communication scheme may be a short-range communication network, such as Bluetooth, wireless fidelity (Wi-Fi) direct, or infrared data association (IrDA), or may be a long-range communication network, such as a legacy cellular network, the 5G network, a next generation communication network, the Internet, or a computer network (LAN or WAN).

According to an embodiment of the disclosure, the second display 540 may visually provide information to the outside (e.g., a user) of the head-mounted device 200 and 300. According to an embodiment of the disclosure, the second display 540 may be a display module including a display panel, a hologram device, or a projector, and a control circuit to control a corresponding device.

According to an embodiment of the disclosure, the second display 540 may be configured to correspond to each of the eyes of a user. According to an embodiment of the disclosure, the second display 540 may display an image or a video in a transparent display member (e.g., the display member 201 of FIG. 2) disposed in front of the eyes of the user. According to an embodiment of the disclosure, the image or video displayed on the display member 210 may be provided in the form of an augmented reality (AR).

According to an embodiment of the disclosure, the second detection sensor 550 may detect a location, an environment, a brightness, or a gradient of the head-mounted device 200 and 300. According to an embodiment of the disclosure, the second detection sensor 550 may detect, based on a global positioning system (GPS), the location of the head-mounted device 200 and 300.

According to an embodiment of the disclosure, the second detection sensor 550 may detect a location relative to an electronic device (e.g., the electronic device 101 of FIG. 4). For example, the second detection sensor 550 may include at least one of a camera, a vertical cavity surface emitting laser (VCSEL), an infrared ray sensor, an LiDAR sensor, and/or a photodiode, which may detect a location relative to the electronic device 101.

According to an embodiment of the disclosure, the second detection sensor 550 may detect the brightness around the head-mounted device 200 and 300. For example, the second detection sensor 550 may include an illuminance sensor (photo resistor) for measuring the density of luminous flux.

According to an embodiment of the disclosure, the second detection sensor 550 may detect the gradient of the head-mounted device 200 and 300. For example, the second detection sensor 550 may include an acceleration sensor or a gyroscope used for a gradient in 3 degrees of freedom (3DoF) or 6DoF, recognizing a location (a space, an environment), and/or recognizing a movement.

Figure 6:
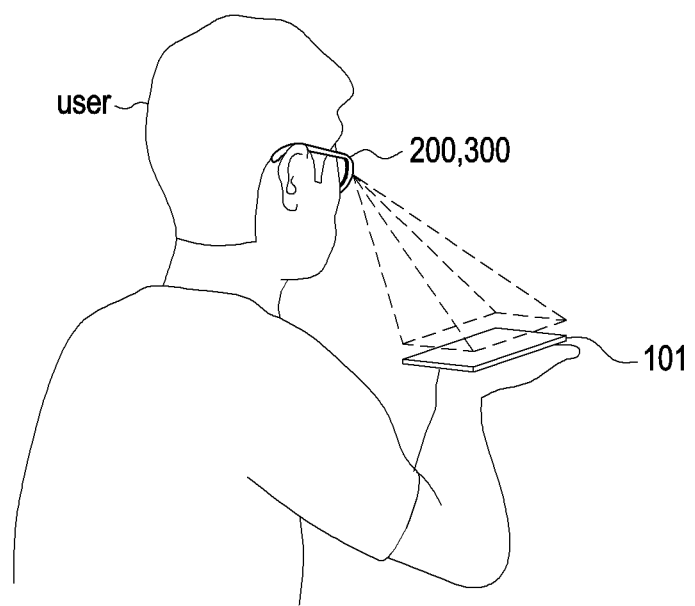
FIG. 6 is a diagram illustrating a state in which a user uses an electronic device and a head-mounted device according to an embodiment of the disclosure.

FIG. 6 is a diagram illustrating a state in which a user uses an electronic device and a head-mounted device according to an embodiment of the disclosure.

Figure 7A:
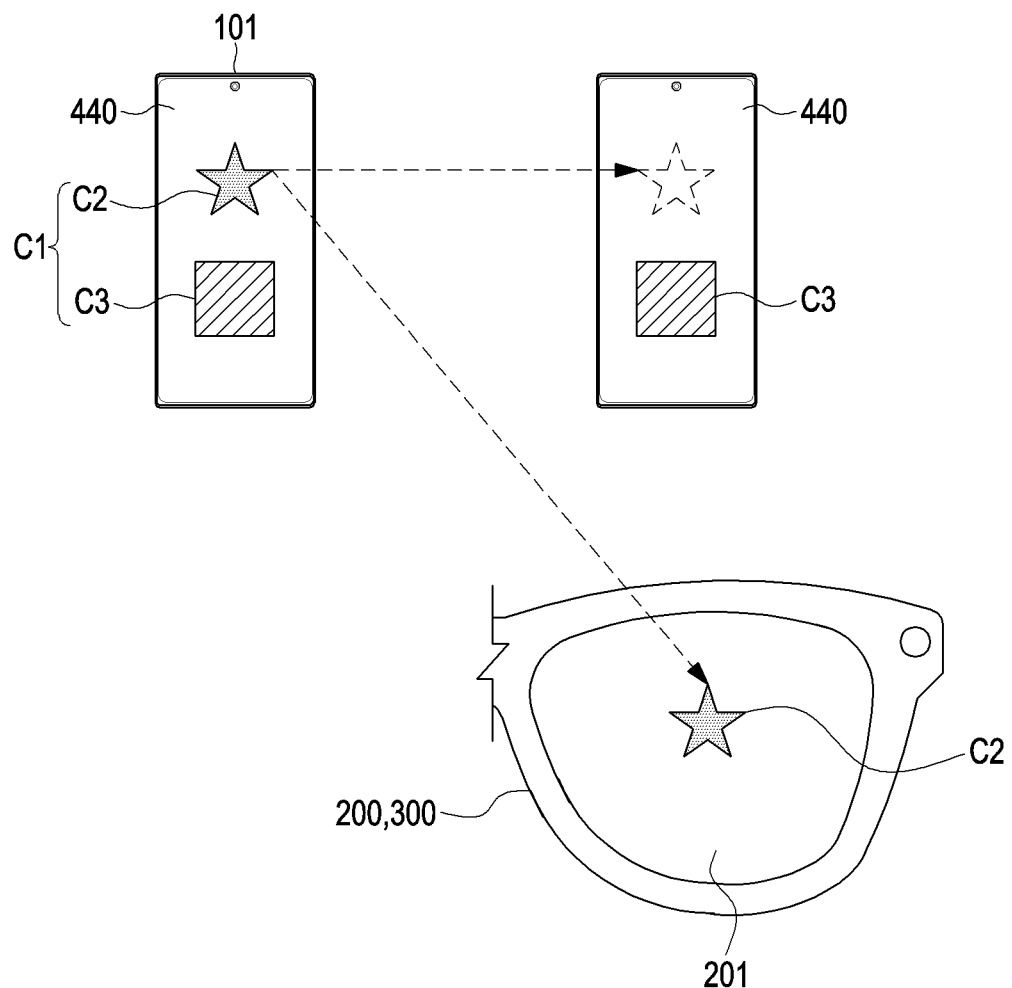
FIG. 7A is a diagram illustrating a display screen of an electronic device and a display screen of a head-mounted device according to an embodiment of the disclosure.
Figure 7B:
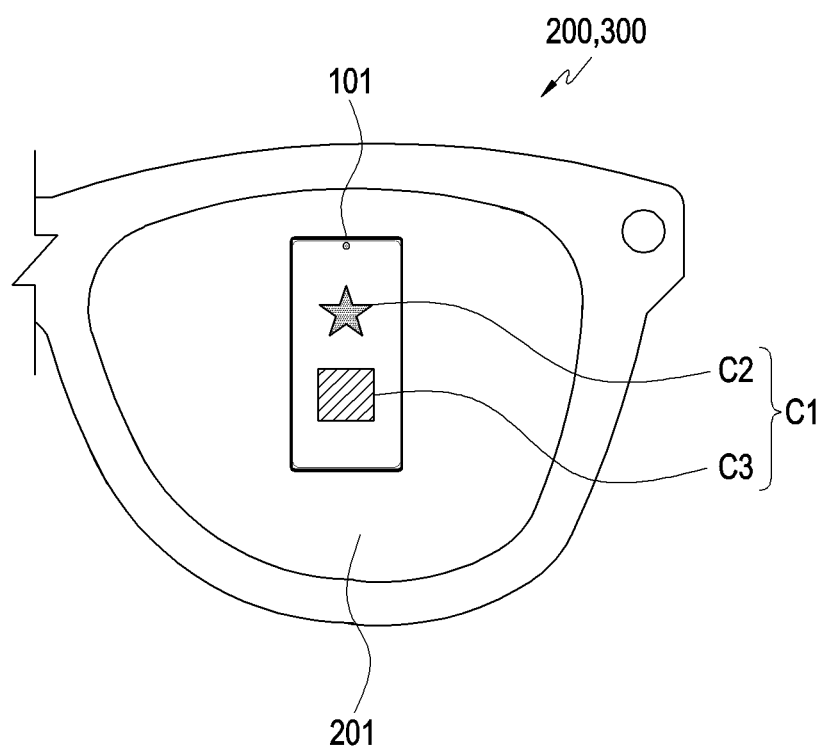
FIG. 7B is a diagram illustrating a head-mounted device that overlays on an electronic device according to an embodiment of the disclosure.

FIG. 7A is a diagram illustrating a display screen of an electronic device and a head-mounted device according to an embodiment of the disclosure. FIG. 7B is a diagram illustrating a head-mounted device that overlays on an electronic device according to an embodiment of the disclosure.

Referring to FIGS. 6, 7A, and 7B, a user may wear the head-mounted device 200 and 300 according to an embodiment of the disclosure, and may use the electronic device 101 according to an embodiment of the disclosure in the state of wearing the head-mounted device 200 and 300. According to an embodiment of the disclosure, the head-mounted device 200 and 300 and the electronic device 101 may be overlaid. For example, a display member (e.g., the display member 201 of FIG. 2) of the head-mounted device 200 and 300 and the first display 440 of the first electronic device 101 may be overlaid, and a user views the electronic device 101 in the state of wearing the head-mounted device 200 and 300, thereby recognizing the display member 201 and the first display 440 which are in the state of being overlaid.

According to an embodiment of the disclosure, the electronic device 101 and the head-mounted device 200 and 300 may establish a communication connection based on a designated communication scheme. According to an embodiment of the disclosure, according to a designated communication scheme, the electronic device 101 and the head-mounted device 200 and 300 may transmit a security code or a security key and may request authentication of the received security code or security key, thereby establishing a communication connection.

According to an embodiment of the disclosure, the electronic device 101 and the head-mounted device 200 and 300 that establish a communication connection may mutually perform transmission or reception of data and/or signals according to a designated communication scheme.

According to an embodiment of the disclosure, from a first content (C1) to be displayed on the first display 440, the electronic device 101 may identify a second content (C2) to be displayed in the head-mounted device 200 and 300. According to an embodiment of the disclosure, the first content (C1) may include the second content (C2) and a third content (C3). For example, the second content (C2) may be a private content that requires security. According to an embodiment of the disclosure, the electronic device 101 may transmit second display data related to the identified second content (C2) to the head-mounted device 200 and 300.

According to an embodiment of the disclosure, the electronic device 101 may display, on the first display 440, first display data in which at least part of the second content (C2) in the first content (C1) is corrected. According to an embodiment of the disclosure, the electronic device 101 may display, on the first display 440, first display data corresponding to a screen in which the second content (C2) is hidden in the first content (C1) and only the third content (C3) is displayed.

According to an embodiment of the disclosure, the head-mounted device 200 and 300 may display the second display data on the second display 540. According to an embodiment of the disclosure, the head-mounted device 200 and 300 may overlay and display the second display data on the electronic device 101 (e.g., the first display 440). According to an embodiment of the disclosure, the head-mounted device 200 and 300 (e.g., the second display 540) may display the second display data corresponding to the second content (C2) on the display member 201 so as to correspond to a location where the second content (C2) is hidden in the screen corresponding to the first display data displayed on the first display 440 of the electronic device 101.

According to an embodiment of the disclosure, from the first content (C1) to be displayed on the first display 440, the electronic device 101 may identify, as the second content (C2), a part of the first content that is unseen in the field of vison of a user due to a finger of the user or an obstacle. According to an embodiment of the disclosure, the electronic device 101 may transmit second display data related to the identified second content (C2) to the head-mounted device 200 and 300. According to an embodiment of the disclosure, the head-mounted device 200 and 300 may display, on the display member 201 via the second display 540, the second content (C2) corresponding to the second display data at a location corresponding to the part of the first content (C1) that is unseen in the field of vision of the user due to a finger of the user or an obstacle.

Referring to FIG. 7B, in the state in which the head-mounted device 200 and 300 and the electronic device 101 are overlaid, a screen corresponding to the third content (C3) displayed in the electronic device 101 and a screen corresponding to the second content (C2) displayed in the head-mounted device 200 and 300 may be overlaid. Accordingly, via the electronic device 101 and the head-mounted device 200 and 300, a user may recognize the first content (C1) including the second content (C2) and the third content (C3), corresponding to displaying a screen corresponding to the first content (C1) to electronic device 101.

Figure 8A:
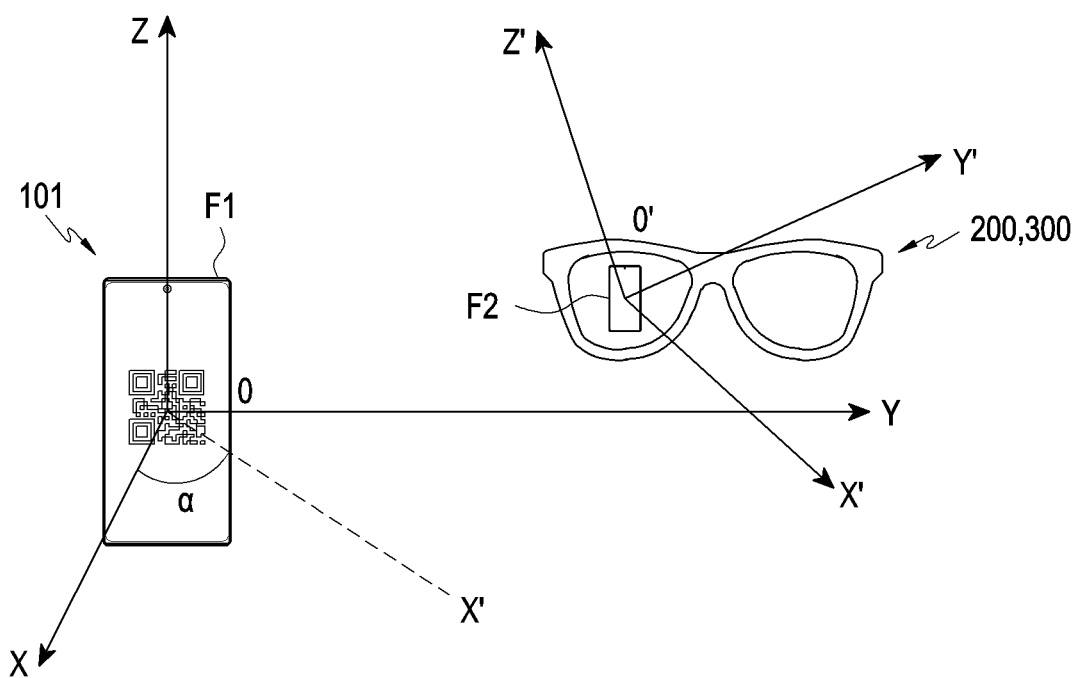
FIG. 8A is a diagram illustrating a coordinate system of an electronic device and a coordinate system of a head-mounted device before calibration according to an embodiment of the disclosure.
Figure 8B:
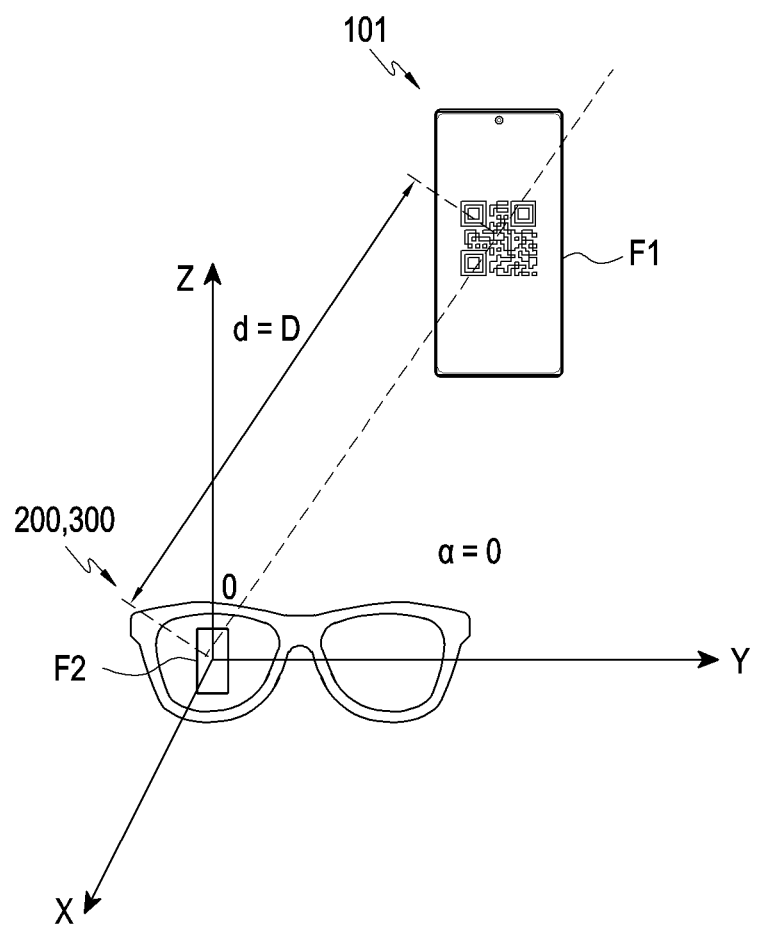
FIG. 8B is a diagram illustrating a coordinate system of an electronic device and a coordinate system of a head-mounted device after calibration according to an embodiment of the disclosure.

FIG. 8A is a diagram illustrating a coordinate system of an electronic device and a coordinate system of a head-mounted device before calibration according to an embodiment of the disclosure. FIG. 8B is a diagram illustrating a coordinate system of an electronic device and a coordinate system of a head-mounted device after calibration according to an embodiment of the disclosure.

Referring to FIGS. 8A and 8B, based on establishing of a communication connection to the head-mounted device 200 and 300 according to a designated communication scheme, the electronic device 101 according to an embodiment may perform calibration on the coordinate system of the electronic device 101 and the coordinate system of the head-mounted device 200 and 300.

A second detection sensor (e.g., the second detection sensor 550 of FIG. 5) of the head-mounted device 200 and 300 according to an embodiment may include a camera (not illustrated) for obtaining an image or a video from the outside. According to an embodiment of the disclosure, the electronic device 101 may display a designated screen on the first display 440. For example, the designated screen may be a security code (e.g., a QR code). According to an embodiment of the disclosure, the camera included in the second detection sensor 550 may obtain, via a scanning operation, an image or a video shown on the designated screen displayed on the first display 440 and may identify the electronic device 101 based on the designated screen. According to an embodiment of the disclosure, based on obtaining of the image or video shown on the designated screen, the head-mounted device 200 and 300 may perform calibration on a coordinate system.

According to an embodiment of the disclosure, the head-mounted device 200 and 300 may display a target outline (F2) corresponding to an actual outline (F1) of the electronic device 101 via the second display 540. According to an embodiment of the disclosure, a user who wears the head-mounted device 200 and 300 may move the head-mounted device 200 and 300 toward the electronic device 101 so that the target outline (F2) displayed via the second display 540 and the actual outline (F1) of the electronic device 101 match. According to an embodiment of the disclosure, the head-mounted device 200 and 300 may identify that the target outline (F2) and the actual outline (F1) match via a camera (not illustrated) included in the second detection sensor 550. According to an embodiment of the disclosure, the head-mounted device 200 and 300 or the electronic device 101 may identify, based on a user input, that the target outline (F2) and the actual outline (F1) match.

According to an embodiment of the disclosure, the electronic device 101 and/or the head-mounted device 200 and 300 may perform calibration so that the coordinate system of the electronic device 101 and the coordinate system of the head-mounted device 200 and 300 match in the state in which the target outline (F2) and the actual outline (F1) match. According to an embodiment of the disclosure, by performing calibration, offsets between the coordinates of the electronic device 101 (e.g., the first display 440) and the coordinates of the head-mounted device 200 and 300 (e.g., the second display 540) may be determined and stored as given in Equation 1 to Equation 4.

$$\Delta d_x = X_m - X_g \quad \text{Equation 1}$$

$$\Delta d_y = Y_m - Y_g \quad \text{Equation 2}$$

$$D = Z_m - Z_g \quad \text{Equation 3}$$

$$\alpha = 0 \quad \text{Equation 4}$$

Here, $X_m$, $Y_m$, and $Z_m$ are coordinates in the x-axis, y-axis, and z-axis of the electronic device 101 (e.g., the first display 440), respectively. $X_g$, $Y_g$, and $Z_g$, are coordinates in the x-axis, y-axis, and z-axis of the head-mounted device 200 and 300 (e.g., the second display 540), respectively. Here, $\Delta d_x$, $\Delta d_y$, and D are offset distances between the electronic device 101 and the head-mounted device 200 and 300 in the x-axis, y-axis, and z-axis, respectively, which may be predetermined values. Here, $\alpha$ is a relative gradient between the electronic device 101 and the head-mounted device 200 and 300, and the relative gradient may be 0 when coordinate systems match.

According to an embodiment of the disclosure, the head-mounted device 200 and 300 may obtain an image or a video displayed in the electronic device 101 by using a camera (not illustrated) included in the second detection sensor 550, and may automatically perform calibration on a coordinate system based on the obtained image or video. For example, based on a distance spaced apart from the electronic device 101 or a gradient relative to the electronic device 101, and based on a varying image or video displayed in the electronic device 101, the head-mounted device 200 and 300 may identify the distance spaced apart from the electronic device 101 and the gradient relative to the electronic device 101, and may perform calibration on the coordinate system based thereon.

Figure 9A:
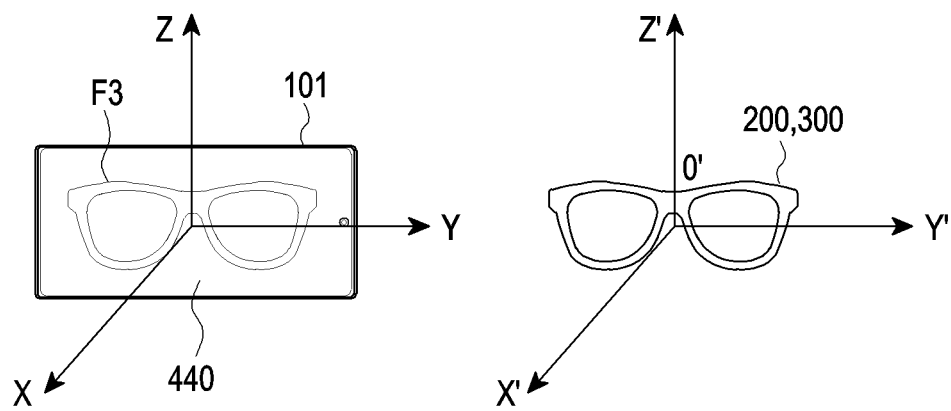
FIG. 9A is a diagram illustrating a coordinate system of an electronic device and a coordinate system of a head-mounted device according to an embodiment of the disclosure.
Figure 9B:
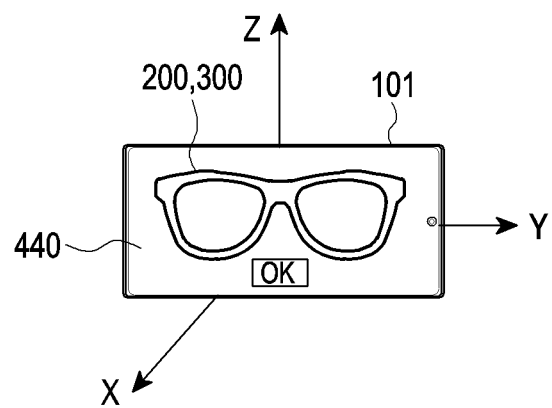
FIG. 9B is a diagram illustrating a coordinate system of an electronic device and a coordinate system of a head-mounted device, which match each other, according to an embodiment of the disclosure.

FIG. 9A is a diagram illustrating a coordinate system of an electronic device and a coordinate system of a head-mounted device according to an embodiment of the disclosure. FIG. 9B is a diagram illustrating a coordinate system of an electronic device and a coordinate system of a head-mounted device, which match each other, according to an embodiment of the disclosure.

Referring to FIGS. 9A and 9B, the electronic device 101 and the head-mounted device 200 and 300 according to an embodiment may perform calibration on the coordinate system of the electronic device 101 and the coordinate system of the head-mounted device 200 and 300 without using a camera.

According to an embodiment of the disclosure, based on establishing of a communication connection to the head-mounted device 200 and 300 according to a designated communication scheme, the electronic device 101 may perform calibration. According to an embodiment of the disclosure, in case that calibration is performed, a guide frame (F3) corresponding to the head-mounted device 200 and 300 may be displayed via the first display 440. According to an embodiment of the disclosure, a user may locate the head-mounted device 200 and 300 to correspond to the guide frame (F3) displayed on the first display 440. According to an embodiment of the disclosure, the electronic device 101 may obtain an input corresponding to calibration from a user in the state in which the head-mounted device 200 and 300 corresponds to the guide frame (F3) displayed on the first display 440.

According to an embodiment of the disclosure, the electronic device 101 and/or the head-mounted device 200 and 300 may perform calibration so that the coordinate system of the electronic device 101 and the coordinate system of the head-mounted device 200 and 300 match in the state in which a sample frame and the head-mounted device 200 and 300 match. According to an embodiment of the disclosure, by performing calibration, an offset between the coordinates of the electronic device 101 (e.g., the first display 440) and the coordinates of the head-mounted device 200 and 300 (e.g., the second display 540) may be determined and stored as given in Equation 5 and Equation 6.

$$\begin{bmatrix} \Delta d_x \\ \Delta d_y \\ \Delta d_z \end{bmatrix} = \begin{bmatrix} X_m - X_g \\ Y_m - Y_g \\ Z_m - Z_g \end{bmatrix} \quad \text{Equation 5}$$

$$\Delta \alpha_x = \Delta \alpha_y = \Delta \alpha_z = 0$$

Here, $X_m$, $Y_m$, and $Z_m$ are coordinates in the x-axis, y-axis, and z-axis of the electronic device 101 (e.g., the first display 440), respectively. $X_g$, $Y_g$, and $Z_g$ are coordinates in the x-axis, y-axis, and z-axis of the head-mounted device 200 and 300 (e.g., the second display 540), respectively. Here, $\Delta d_x$, $\Delta d_y$, and $\Delta d_z$ are offset distances between the electronic device 101 and the head-mounted device 200 and 300 in the x-axis, y-axis, and z-axis, respectively, which may be predetermined values. Here, $\Delta \alpha_x$, $\Delta \alpha_y$, $\Delta \alpha_z$ are relative gradients between the electronic device 101 and the head-mounted device 200 and 300 in the x-axis, y-axis, and z-axis, respectively, and a relative gradient may be 0 when coordinate systems match.

According to an embodiment of the disclosure, the electronic device 101 and/or the head-mounted device 200 and 300 may determine, based on a designated offset, a size and a shape associated with second display data (e.g., an object) described later. For example, the electronic device 101 and/or the head-mounted device 200 and 300 may determine a size of the second display data (e.g., an object) by using an offset distance of Equation 5, and may determine a shape associated with the second display data (e.g., an object) by using a relative gradient of Equation 6.

Therefore, without using a camera of the head-mounted device 200 and 300, calibration on the coordinate systems between the electronic device 101 and the head-mounted device may be performed. According to an embodiment of the disclosure, after calibration, the electronic device 101 or the head-mounted device 200 and 300 may detect, based on a relative movement between the electronic device 101 and the head-mounted device, a movement of a coordinate system in the x-axis, y-axis, and z-axis. According to an embodiment of the disclosure, after calibration, the electronic device 101 or the head-mounted device 200 and 300 may detect, based on a relative rotation between the electronic device 101 and the head-mounted device, a rotation of a coordinate system in the x-axis, y-axis, and z-axis.

The electronic device 101 according to an embodiment of the disclosure may identify, based on an executed application, a second content from a first content corresponding to a screen displayed on the first display 440, and may detect a displaying location of the identified second content. According to an embodiment of the disclosure, the electronic device 101 may correct at least part of the second content in the first content, and may display resultant first display data on the first display 440.

Based on a trigger signal corresponding to an input or an environment of the electronic device 101, the electronic device 101 according to an embodiment of the disclosure may identify the second content (e.g., the second content (C2) of FIG. 7A) included in the first content (e.g., the first content (C1) of FIG. 7A). For example, in case that the electronic device 101 satisfies a condition of a designated environment, or in case that a user input is provided to the electronic device 101, the electronic device 101 may produce a trigger signal corresponding to a private mode and may identify, based on the trigger signal, the second content (C2) in the first content (C1).

According to an embodiment of the disclosure, based on a first detection sensor (e.g., the first detection sensor 450 of FIG. 4), the electronic device 101 may obtain data related to an environment around the electronic device 101. Based on data related to the obtained surrounding environment, the electronic device 101 may identify whether a condition of a designated environment is satisfied. According to an embodiment of the disclosure, the condition of a designated environment relates to whether an environment is a public environment. For example, whether an environment is a public environment may be identified based on the location of the electronic device 101 or based on the intensity of an electric wave or sound around the electronic device 101.

According to an embodiment of the disclosure, based on a user input related to whether to activate a private mode, the electronic device 101 may identify the second content (C2) from the first content (C1). For example, in case that a private mode is activated based on a user input, the electronic device 101 may identify the second content (C2) from the first content (C1). For example, in case that a private mode is deactivated based on a user input, the electronic device 101 may not identify the second content (C2) from the first content (C1) even though the environment is identified as a public environment.

According to an embodiment of the disclosure, in case that a condition of a designated environment is identified as being satisfied based on data related to a surrounding environment, the electronic device 101 may provide, to a user, a notification related to whether to activate a private mode. According to an embodiment of the disclosure, based on a user input associated with a notification related to whether to activate a private mode, the electronic device 101 may activate a private mode.

According to an embodiment of the disclosure, in case that a trigger signal corresponding to an input or an environment of the electronic device 101 is produced, the electronic device 101 may identify a communication connection with the head-mounted device 200 and 300 according to a designated communication scheme. According to an embodiment of the disclosure, in case that the communication connection to the head-mounted device 200 and 300 is performed, the electronic device 101 may transmit second display data related to the second content to the head-mounted device 200 and 300.

According to an embodiment of the disclosure, in case that the communication connection to the head-mounted device 200 and 300 is not performed, the electronic device 101 may provide, to the first display 440, a notification related to a connection to the head-mounted device 200 and 300.

Figure 10A:
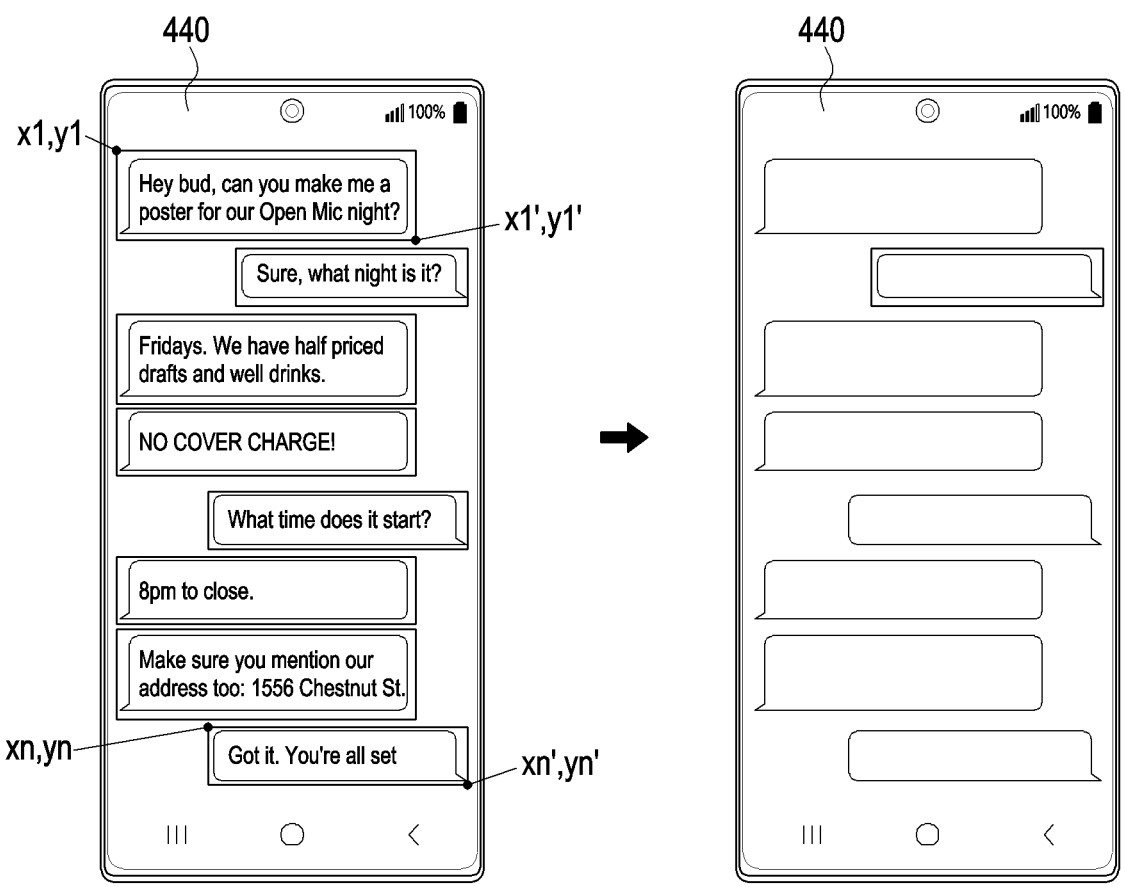
FIG. 10A is a diagram illustrating a display screen of an application according to an embodiment of the disclosure.
Figure 10B:
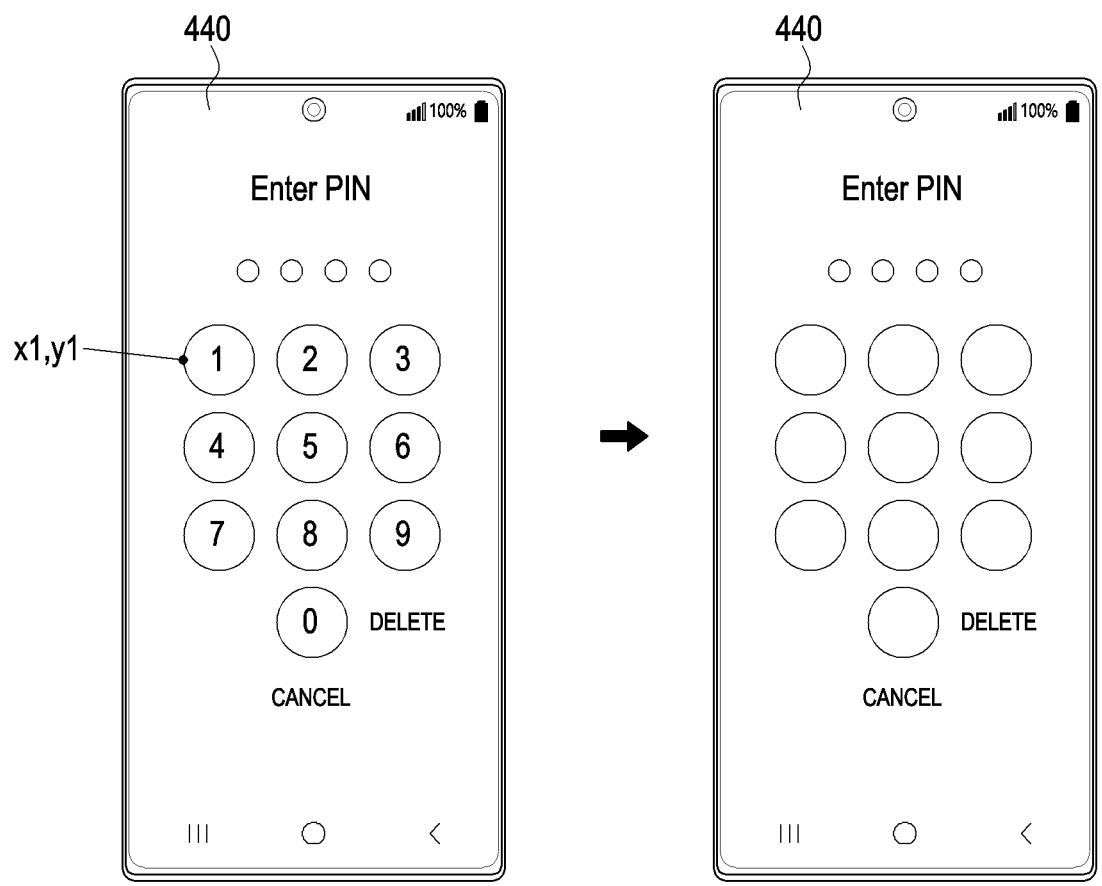
FIG. 10B is a diagram illustrating a display screen of an application according to an embodiment of the disclosure.
Figure 10C:
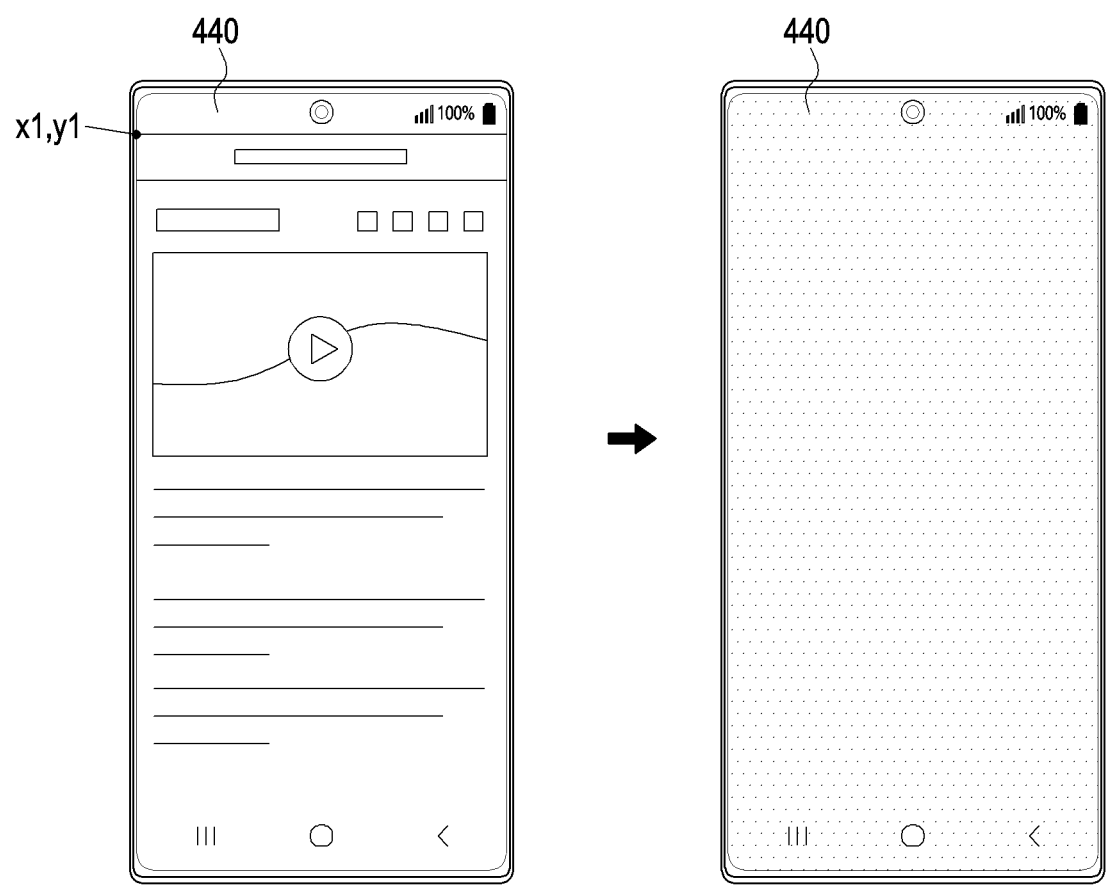
FIG. 10C is a diagram illustrating a display screen of an application according to an embodiment of the disclosure.

FIG. 10A is a diagram illustrating a display screen of an application according to an embodiment of the disclosure, FIG. 10B is a diagram illustrating a display screen of an application according to an embodiment of the disclosure, and FIG. 10C is a diagram illustrating a display screen of an application according to an embodiment of the disclosure.

Referring to FIGS. 10A, 10B, and 10C, the electronic device 101 according to an embodiment may identify, based on an executed application, a second content (e.g., the second content (C2) of FIG. 7A) included in first content (e.g., first content (C1) of FIG. 7A).

Referring to FIG. 10A, in case that the executed application is a message application or an over the top (OTT) application, the electronic device 101 according to an embodiment may identify a second content (C2) from a first content (C1) that is a screen of the corresponding application. According to an embodiment of the disclosure, the electronic device 101 may identify, as the second content (C2), a text box corresponding to a private content in the layout of the corresponding application.

Referring to FIG. 10B, in case that the executed application is a personal identification number (PIN) input keyboard, the electronic device 101 according to an embodiment may identify a second content (C2) from a first content (C1) that is a screen of the corresponding application. According to an embodiment of the disclosure, the electronic device 101 may identify, as the second content (C2), a keyboard layout included in a screen of the corresponding application.

Referring to FIG. 10C, in case that the executed application is an entertainment application, the electronic device 101 according to an embodiment of the disclosure may identify a second content (C2) from a first content (C1) that is a screen of the corresponding application. According to an embodiment of the disclosure, the electronic device 101 may identify, as the second content (C2), a viewing area for an entertainment content in the layout of the corresponding application.

The electronic device 101 according to an embodiment may display, on the first display 440, first display data in which the identified second content is hidden. The electronic device 101 according to an embodiment may transmit coordinates ({(x1,y1), (x1',y1')}, . . . , {(xn,yn), (xn',yn')}) corresponding to the second content to the head-mounted device 200 and 300.

Figure 11A:
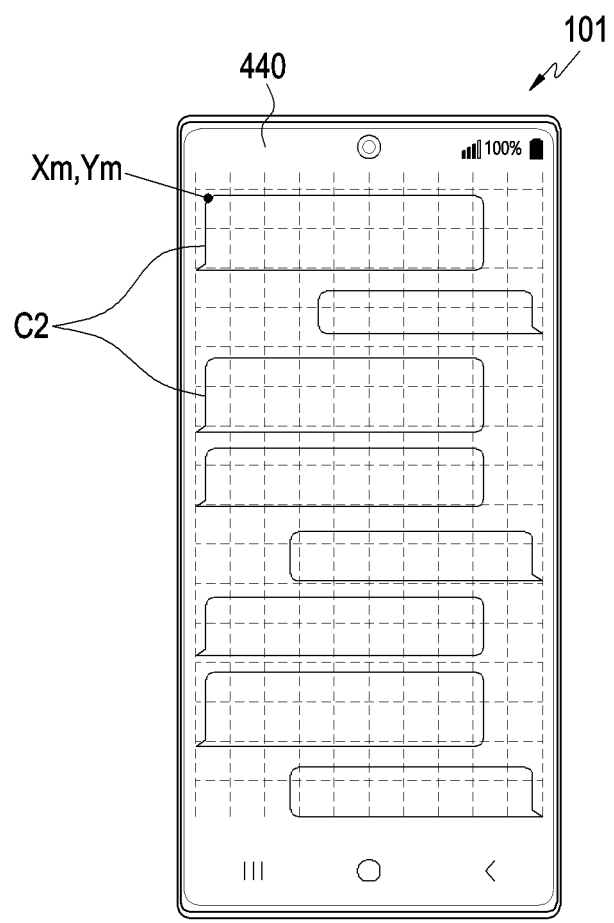
FIG. 11A is a diagram illustrating a screen displayed on a first display of an electronic device according to an embodiment of the disclosure.
Figure 11B:
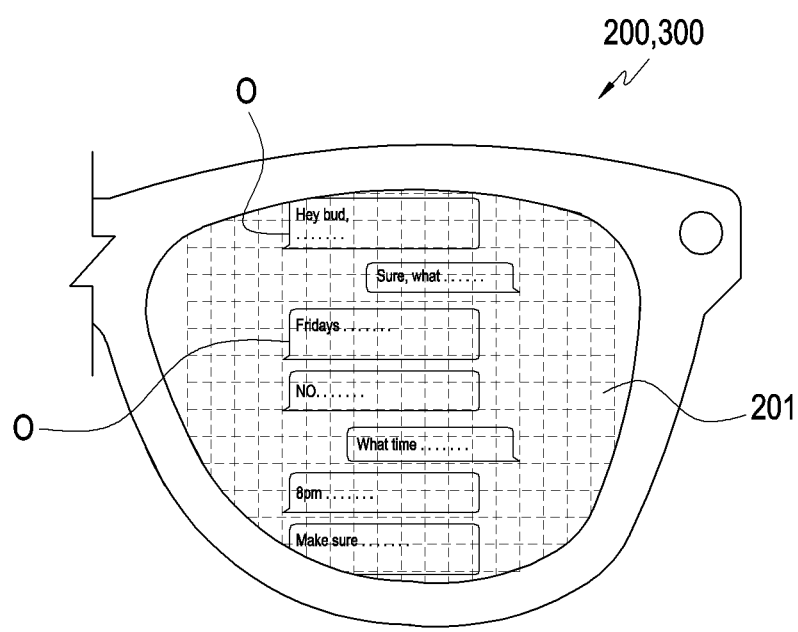
FIG. 11B is a diagram illustrating a screen displayed on a second display of a head-mounted device according to an embodiment of the disclosure.

FIG. 11A is a diagram illustrating a screen displayed on a first display of an electronic device according to an embodiment of the disclosure. FIG. 11B is a diagram illustrating a screen displayed on a second display of a head-mounted device according to an embodiment of the disclosure.

Referring to FIGS. 11A and 11B, the electronic device 101 according to an embodiment may display, on the first display 440, first display data in which at least part of a second content (C2) is corrected. According to an embodiment of the disclosure, the electronic device 101 may display, on the first display 440, first display data corresponding to a screen in which the second content (C2) is hidden in a first content (e.g., the first content (C1) of FIG. 7A).

According to an embodiment of the disclosure, the electronic device 101 may display a hidden screen (e.g., blurring or displaying of a background) at coordinates (Xm, Ym) corresponding to the location of the second content (C2).

According to an embodiment of the disclosure, the head-mounted device 200 and 300 may display second display data corresponding to the second content (C2) via the second display 540. According to an embodiment of the disclosure, based on a screen displayed on the first display 440 of the electronic device 101, the head-mounted device 200 and 300 may display the second display data on the display member 201 via the second display 540. According to an embodiment of the disclosure, the electronic device 101 or the head-mounted device 200 and 300 may determine the coordinates (Xg, Yg) of an object (O) displayed on the second display 540 so as to correspond to the coordinates (Xm, Ym) corresponding to the location of the second content in the first display 440 of the electronic device 101.

According to an embodiment of the disclosure, based on the coordinates (Xm, Ym) corresponding to the location of the second content in the first display 440 of the electronic device 101, the electronic device 101 or the head-mounted device 200 and 300 may determine the coordinates (Xg, Yg) of the object (O) according to Equation 7 given below.

$$\begin{bmatrix} X_g \\ Y_g \end{bmatrix} = \begin{bmatrix} X_m + f(\Delta d_x, \Delta \alpha_x) \\ X_m + (\Delta d_y, \Delta \alpha_y) \end{bmatrix} \quad \text{Equation 7}$$

Here, f denotes a previously stored equation for converting coordinates based on a change in a relative distance and a change in a relative gradient. In addition, $\Delta d_x$ and $\Delta d_y$ denote changes in relative distances between the electronic device 101 and the head-mounted device 200 and 300 from a calibration state in the x-axis and y-axis, respectively, and $\Delta \alpha_x$ and $\Delta \alpha_y$ denote changes in relative gradients between the electronic device 101 and the head-mounted device 200 and 300 from the calibration state in the x-axis and y-axis, respectively.

According to an embodiment of the disclosure, the head-mounted device 200 and 300 may display the second display data via the second display 540 so that the object (O) corresponding to the second content overlays on the location of the second content (C2) in the first display 440 of the electronic device 101. According to an embodiment of the disclosure, an object displayed on the display member 201 via the second display 540 may be provided in the form of an augmented object.

Figure 12:
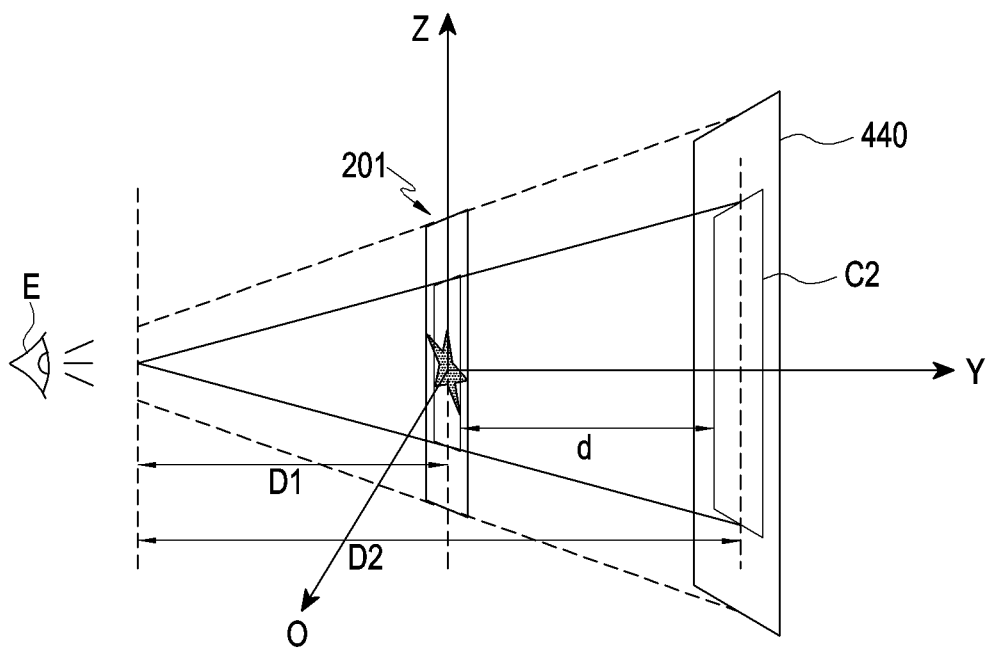
FIG. 12 is a schematic diagram illustrating a size of an object displayed on a display member of a head-mounted device according to an embodiment of the disclosure.

FIG. 12 is a schematic diagram illustrating a size of an object displayed on a display member of a head-mounted device according to an embodiment of the disclosure.

Referring to FIG. 12, according to an embodiment of the disclosure, the electronic device 101 or the head-mounted device 200 and 300 may determine the size of an object (O) based on a relative distance (d) between the electronic device 101 and the head-mounted device 200 and 300. The head-mounted device 200 and 300 according to an embodiment of the disclosure may display, based on the determined size of the object (O), the object (O) corresponding to a second display data (C2) on the display member 201 via the second display 540.

According to an embodiment of the disclosure, based on the size of the second content (C2) in a hidden state in the first display 440 of the electronic device 101 and the relative distance (d) between the electronic device 101 and the head-mounted device 200 and 300, the electronic device 101 or the head-mounted device 200 and 300 may determine the size of the object (O) according to Equation 8 given below.

$$SOAO = \frac{D1}{D2} \cdot SOOC \quad \text{Equation 8}$$

Here, SOAO denotes the size of the object (O) displayed on the second display 540, and SOOC denotes the original size of the second content (C2) displayed on the first display 440. In addition, D1 denotes the distance between an eye (E) (e.g., retina) of a user and the display member 201 of the head-mounted device 200 and 300. D2 denotes the distance between the eye (E) of the user and the first display 440 of the electronic device 101, and D2 may be the sum of D1 and the relative distance (d) between the electronic device 101 and the head-mounted device 200 and 300.

Figure 13:
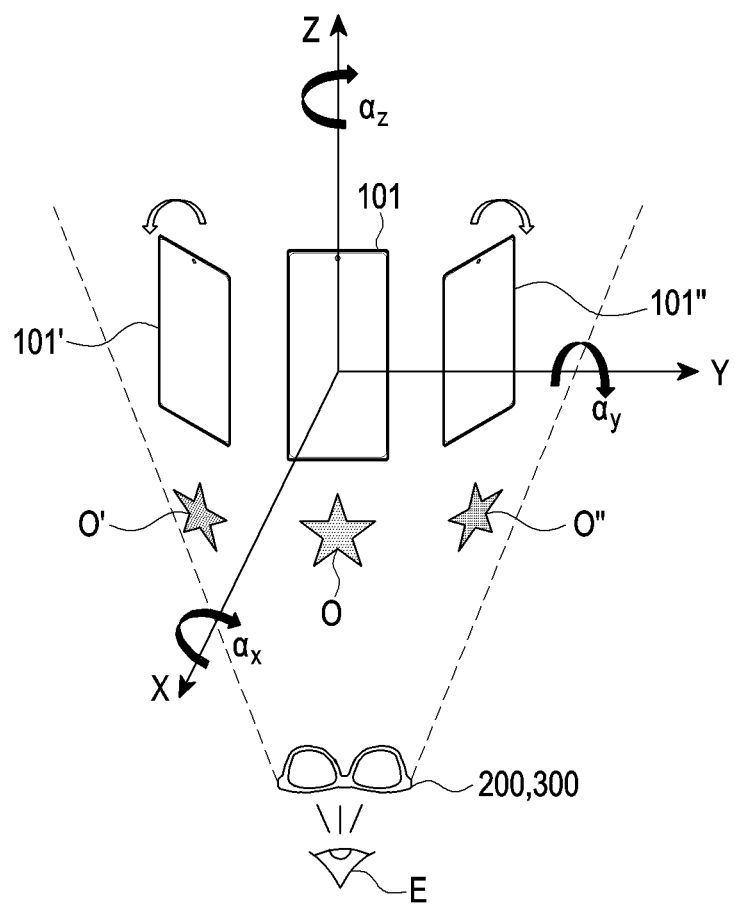
FIG. 13 is a schematic diagram illustrating a form of an object displayed on a display member of a head-mounted device according to an embodiment of the disclosure.

FIG. 13 is a schematic diagram illustrating a shape of an object (O) displayed on a display member of a head-mounted device according to an embodiment of the disclosure.

Referring to FIG. 13, based on a relative gradient between the electronic device 101 and the head-mounted device 200 and 300, the electronic device 101 or the head-mounted device 200 and 300 according to an embodiment may determine the shape of the object (O) displayed on the display member 201 via the second display 540 of the head-mounted device 200 and 300.

According to an embodiment of the disclosure, the electronic device 101 may rotate relative to the head-mounted device 200 and 300 in the x-axis, y-axis, and z-axis. According to an embodiment of the disclosure, the relative gradient based on the relative rotation between the electronic device 101 and the head-mounted device 200 and 300 may be obtained according to Equation 9 as given below.

$$\begin{bmatrix} \Delta\alpha_x \\ \Delta\alpha_y \\ \Delta\alpha_z \end{bmatrix} = \begin{bmatrix} \Delta\alpha_{xM} - \Delta\alpha_{xG} \\ \Delta\alpha_{yM} - \Delta\alpha_{yG} \\ \Delta\alpha_{zM} - \Delta\alpha_{zG} \end{bmatrix} \quad \text{Equation 9}$$

Here, and $\Delta\alpha_x$, $\Delta\alpha_y$, and $\Delta\alpha_z$ are relative gradients obtained by relative rotation performed between the electronic device 101 and the head-mounted device 200 and 300 in the x-axis, y-axis, and z-axis, respectively. In addition, $\Delta\alpha_{xM}$, $\Delta\alpha_{yM}$, and $\Delta\alpha_{zM}$ denote changes in gradients incurred by rotation about the x-axis, y-axis, or z-axis of the electronic device 101, respectively, from a calibration state. $\Delta\alpha_{xG}$, $\Delta\alpha_{yG}$, and $\Delta\alpha_{zG}$ denote changes in gradients incurred by rotation about the x-axis, y-axis, or z-axis of the head-mounted device 200 and 300, respectively, from the calibration state.

The electronic device 101 or the head-mounted device 200 and 300 according to an embodiment may determine, based on a relative gradient based on relative rotation, the shape of the object (O) displayed in the head-mounted device 200 and 300. For example, in case that the electronic device 101 rotates in one side 101' or in the other side 101" relative to the head-mounted device 200 and 300 or an eye (E) of a user, the shape of the object may be changed to predetermined shapes (O', O"), respectively.

According to an embodiment of the disclosure, the electronic device 101 or the head-mounted device 200 and 300 may store in advance the shape of the object (O) or conversion data of the shape that corresponds to each of the direction and angle of relative rotation, and may determine the shape of the object (O) based on the stored shape or conversion data.

The electronic device 101 or the head-mounted device 200 and 300 according to an embodiment may determine the size of the object (O), may determine the shape of the object (O), and may determine the location of the object (O). According to an embodiment of the disclosure, the object (O) may be an augmented object corresponding to a second content (C2).

The electronic device 101 according to an embodiment may transmit, to the head-mounted device 200 and 300, a display attribute including at least one of the displaying location, displaying form, or brightness of the object (O) corresponding to the second content (C2). The head-mounted device 200 and 300 according to an embodiment may produce an object based on a display attribute received from the electronic device 101. The head-mounted device 200 and 300 according to an embodiment may display a produced object on the display member 201 via the second display 540.

The electronic device 101 according to an embodiment may receive data related to the location or gradient of the head-mounted device 200 or 300 from the head-mounted device 200 and 300, and may produce the object (O) based on the second content (C2) and the received data related to the location or the gradient. The electronic device 101 according to an embodiment may transmit data related to the produced object to the head-mounted device 200 and 300 via a first communication interface (e.g., the first communication interface 430 of FIG. 4). Based on the data related to the object (O) received from the electronic device 101, the head-mounted device 200 and 300 according to an embodiment may display the object (O) on the display member 201 via the second display 540.

In addition, based on the brightness around the head-mounted device 200 and 300 measured by a second detection sensor (e.g., the second detection sensor 550 of FIG. 5), the electronic device 101 or the head-mounted device 200 or 300 according to an embodiment may determine the brightness of the object (O) displayed via the second display 540. For example, in case that the ambient brightness is relatively high, the head-mounted device 200 and 300 may display the object (O) relatively bright via the second display 540. For example, in case that the ambient brightness is relatively low, the head-mounted device 200 and 300 may display the object (O) relatively dark via the second display 540.

Figure 14A:
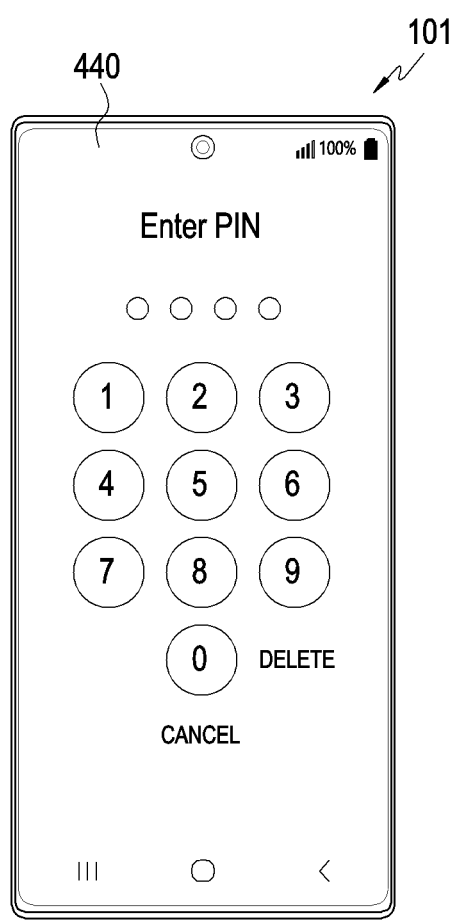
FIG. 14A is a diagram illustrating a screen of an application including at least one button according to an embodiment of the disclosure.
Figure 14B:
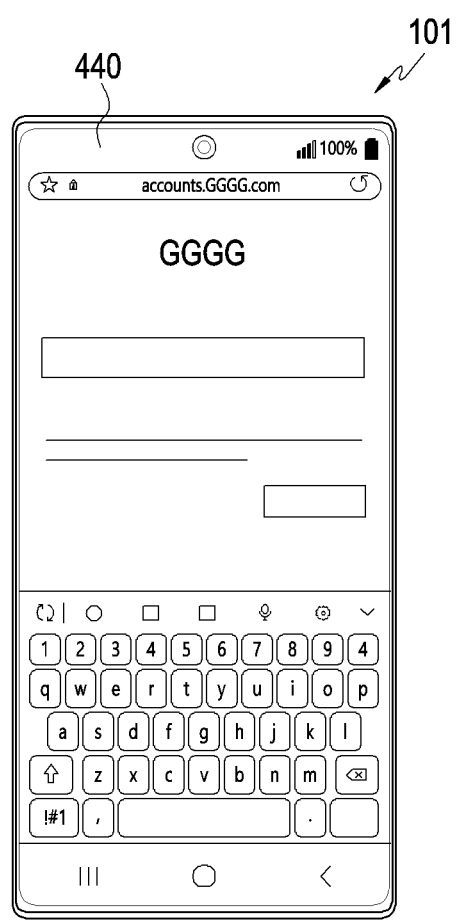
FIG. 14B is a diagram illustrating a screen of an application including at least one button according to an embodiment of the disclosure.
Figure 14C:
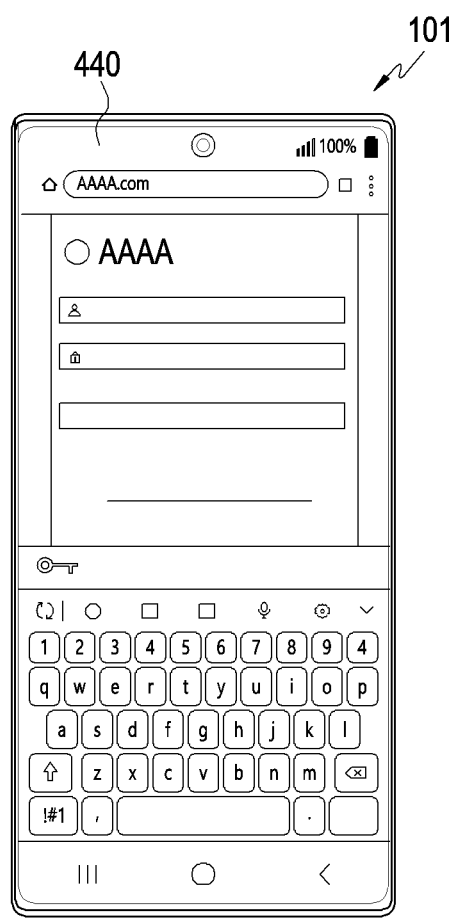
FIG. 14C is a diagram illustrating a screen of an application including at least one button according to an embodiment of the disclosure.

FIG. 14A is a diagram illustrating a screen of an application including at least one button according to an embodiment of the disclosure, FIG. 14B is a diagram illustrating a screen of an application including at least one button according to an embodiment of the disclosure, and FIG. 14C is a diagram illustrating a screen of an application including at least one button according to an embodiment of the disclosure.

Figure 15:
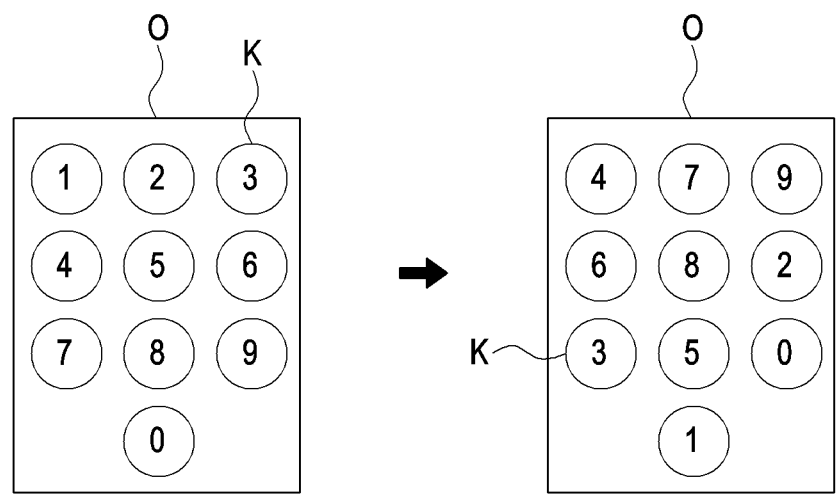
FIG. 15 is a diagram illustrating changing a location of at least one button according to an embodiment of the disclosure.

FIG. 15 is a diagram illustrating changing a location of at least one button according to an embodiment of the disclosure.

Referring to FIGS. 14A, 14B, 14C, and 15, the electronic device 101 according to an embodiment of the disclosure may display, based on execution of an application, a screen of an application including at least one button in the first display 440.

According to an embodiment of the disclosure, in case that a predetermined application displays a keyboard screen for inputting a personal identification number (PIN) as illustrated in FIG. 14A, or displays a keyboard for logging on a personal account and/or a keyboard screen for a password of a bank application as illustrated in FIG. 14B, the electronic device 101 may display a screen of an application including at least one button.

According to an embodiment of the disclosure, the electronic device 101 may change, based on an application executed, the location of at least one displayed button, and may transmit, to the head-mounted device 200 and 300, second display data in which the location of the at least one button is changed. For example, the electronic device 101 may change the location of at least one button according to a designated pattern, and may randomly change the location of at least one button.

According to an embodiment of the disclosure, the electronic device 101 may change the location of at least one button (K) included in a displayed keyboard, as illustrated in FIG. 15. According to an embodiment of the disclosure, the electronic device 101 may change the location of at least one button (K) included in a keyboard to be displayed as an object (O) on a display member (e.g., the display member 201 of FIG. 2) in the head-mounted device 200 and 300.

For example, in case that a button corresponding to 4 is located in the location of a button corresponding to 1 and a user touches the button corresponding to 4, it may be assumed from the outside that the user touches the button corresponding 1, and thus security may be ensured.

Figure 16A:
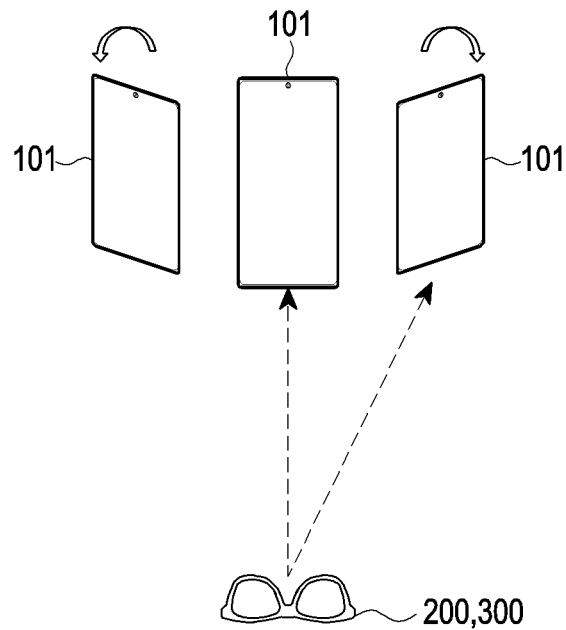
FIG. 16A is a diagram illustrating a state in which a relative gradient between an electronic device and a head-mounted device falls within a threshold range according to an embodiment of the disclosure.
Figure 16B:
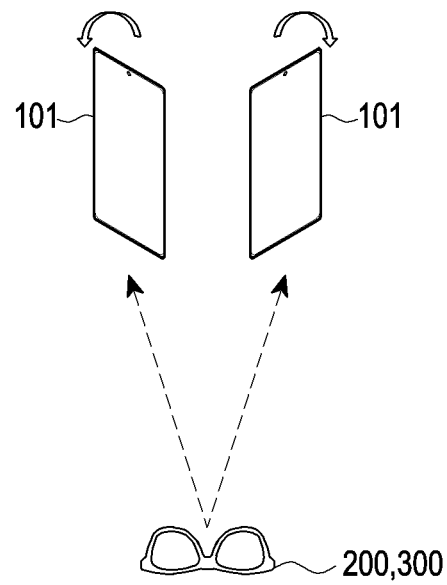
FIG. 16B is a diagram illustrating a state in which a relative gradient between an electronic device and a head-mounted device is beyond a threshold range according to an embodiment of the disclosure.

FIG. 16A is a diagram illustrating a state in which a relative gradient (α) between an electronic device and a head-mounted device falls within a threshold range (e.g., 0≤α≤δ) according to an embodiment of the disclosure. FIG. 16B is a diagram illustrating a state in which a relative gradient (α) between an electronic device and a head-mounted device is beyond a threshold range (e.g., α≥δ) according to an embodiment of the disclosure.

Referring to FIGS. 16A and 16B, the electronic device 101 or the head-mounted device 200 and 300 according to an embodiment may identify a relative gradient (α) between the electronic device 101 and the head-mounted device 200 and 300. According to an embodiment of the disclosure, the electronic device 101 may receive data related to a location or gradient from the head-mounted device 200 and 300, and may identify, based on the received data, the relative gradient (α) between the electronic device 101 and the head-mounted device 200 and 300.

According to an embodiment of the disclosure, in case that the identified relative gradient (α) between the electronic device 101 and the head-mounted device 200 and 300 falls within a designated threshold range (e.g., 0≤α≤δ), the electronic device 101 may transmit second display data to the head-mounted device 200 and 300. According to an embodiment of the disclosure, based on the relative gradient (α) between the electronic device 101 and the head-mounted device 200 and 300, the electronic device 101 or the head-mounted device 200 and 300 may change a display shape of an object (O) displayed via the second display 540.

According to an embodiment of the disclosure, in case that the identified relative gradient (α) between the electronic device 101 and the head-mounted device 200 and 300 is beyond a designated threshold range (e.g., α≥δ), the electronic device 101 may not transmit second display data to the head-mounted device 200 and 300.

According to an embodiment of the disclosure, in case that the identified relative gradient (α) between the electronic device 101 and the head-mounted device 200 and 300 is beyond a designated threshold range (e.g., α≥δ), the head-mounted device 200 and 300 may not display an object on the display member 201 via the second display 540.

According to an embodiment of the disclosure, the electronic device 101 or the head-mounted device 200 and 300 may display, on the first display 440 or the second display 540, a notification indicating that the relative gradient (α) between the electronic device 101 and the head-mounted device 200 and 300 is beyond a designated threshold range.

Figure 17:
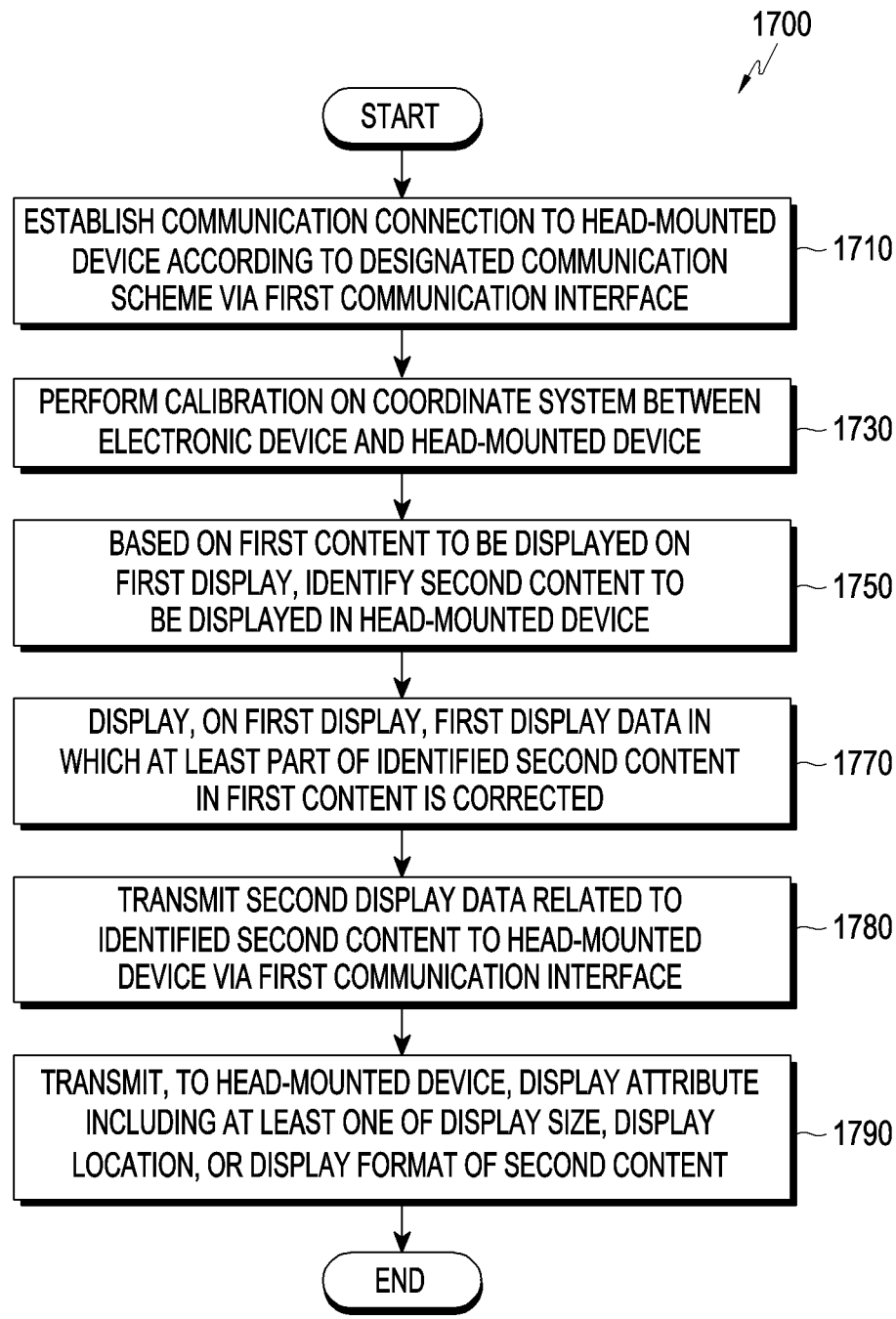
FIG. 17 is a flowchart illustrating a method of operating an electronic device according to an embodiment of the disclosure.

FIG. 17 is a flowchart 1700 illustrating a method of operating an electronic device according to an embodiment of the disclosure.

Referring to FIG. 17, the electronic device 101 according to an embodiment of the disclosure may establish a communication connection to the head-mounted device 200 and 300 according to a designated communication scheme via the first communication interface 430 in operation 1710.

In operation 1730, the electronic device 101 according to an embodiment may perform calibration on a coordinate system between the electronic device 101 and the head-mounted device 200 and 300. According to an embodiment of the disclosure, the electronic device 101 and the head-mounted device 200 and 300 may match their coordinate systems via a calibration operation in the state in which they are spaced apart from each other by a designated distance, or may be configured to be in the state in which they are spaced apart from each other by a designated distance.

In operation 1750, based on a first content (C1) to be displayed on the first display 440, an electronic device 101 according to an embodiment may identify a second content (C2) to be displayed in the head-mounted device 200 and 300. According to an embodiment of the disclosure, the first content (C1) may be a screen corresponding to an application executed by the electronic device 101.

Based on a trigger signal corresponding to an input or an environment of the electronic device 101, the electronic device 101 according to an embodiment may identify the second content (C2) included in the first content. Based on an executed application, the electronic device 101 according to an embodiment may identify the second content (C2) included in the first content (C1).

In operation 1770, the electronic device 101 according to an embodiment may display, on the first display 440, first display data in which at least part of the second content (C2) identified in the first content (C1) is corrected. For example, the electronic device 101 may display, on the first display

440, first display data in which the second content (C2) is in a hidden state in the first content (C1).

In operation 1780, the electronic device 101 according to an embodiment may transmit second display data related to the identified second content (C2) to the head-mounted device 200 and 300 via the first communication interface 430.

In operation 1790, the electronic device 101 according to an embodiment may transmit, to the head-mounted device 200 and 300, a display attribute including at least one of the displaying size, displaying location, or displaying form of the second content (C2). For example, the electronic device 101 may transmit the display attribute of the second content that is to be displayed in a hidden state on the first display 440, and may transmit data related to the location or gradient of the electronic device 101 to the head-mounted device 200 and 300. For example, the electronic device 101 may transmit the display attribute of the second content (C) to be displayed in the head-mounted device 200 and 300.

Figure 18:
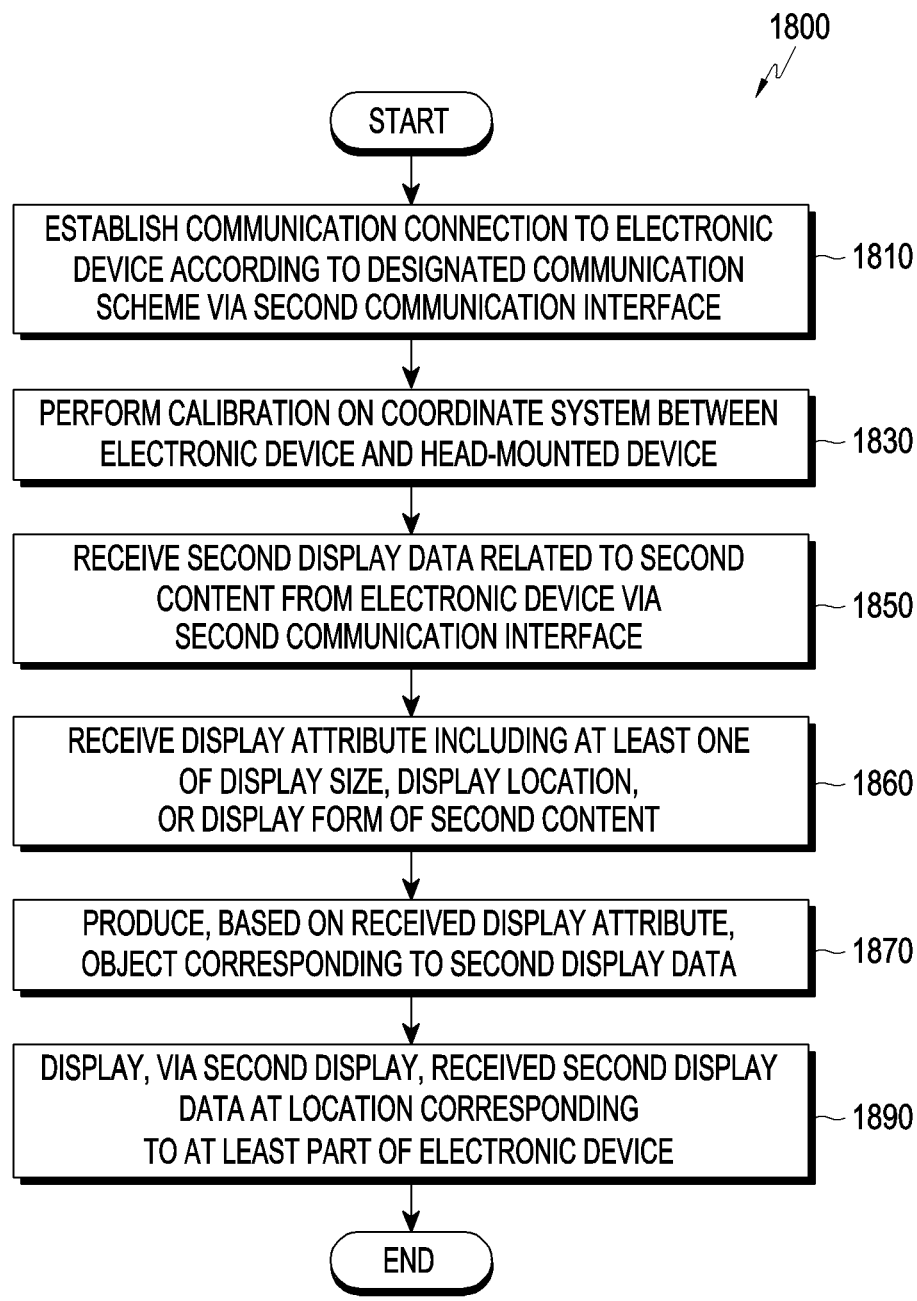
FIG. 18 is a flowchart illustrating a method of operating a head-mounted device according to an embodiment of the disclosure.

FIG. 18 is a flowchart 1800 illustrating a method of operating a head-mounted device according to an embodiment of the disclosure.

Referring to FIG. 18, the head-mounted device 200 and 300 according to an embodiment may establish a communication connection to the electronic device 101 according to a designated communication scheme via the second communication interface 530 in operation 1810.

In operation 1830, the head-mounted device 200 and 300 according to an embodiment may perform calibration on a coordinate system between the electronic device 101 and the head-mounted device 200 and 300.

In operation 1850, the head-mounted device 200 and 300 according to an embodiment may receive second display data related to a second content (C) from the electronic device 101 via the second communication interface 530.

In operation 1860, the head-mounted device 200 and 300 according to an embodiment may receive a display attribute including at least one of a displaying size, a displaying location, or a displaying form of the second content (C2) from the electronic device 101 via the second communication interface 530.

In operation 1870, based on the display attribute received from the electronic device 101, the head-mounted device 200 and 300 according to an embodiment may produce an object (O) corresponding to second display data. Here, the object (O) may be in the form of an augmented object displayed on the display member 201 via the second display 540. According to an embodiment of the disclosure, the head-mounted device 200 and 300 may determine, based on the display attribute, at least one of the displaying size, displaying location, or displaying form of the object (O), and may produce the object (O) based thereon.

In operation 1890, the head-mounted device 200 and 300 according to an embodiment may display the received second display data at a location corresponding to at least part of the electronic device 101 on the second display 540. According to an embodiment of the disclosure, the head-mounted device 200 and 300 may display, in display member 201 via the second display 540, the object (O) produced to correspond to the second display data.

According to an embodiment of the disclosure, the head-mounted device 200 and 300 may display the object (O) corresponding to the second display data at a location that overlays on the electronic device 101 on the display member 201. According to an embodiment of the disclosure, the head-mounted device 200 and 300 may display, on the display member 201, the object (O) corresponding to the second display data at a location that corresponds to the second content displayed in a hidden state in the first display 440 of the electronic device 101.

Figure 19:
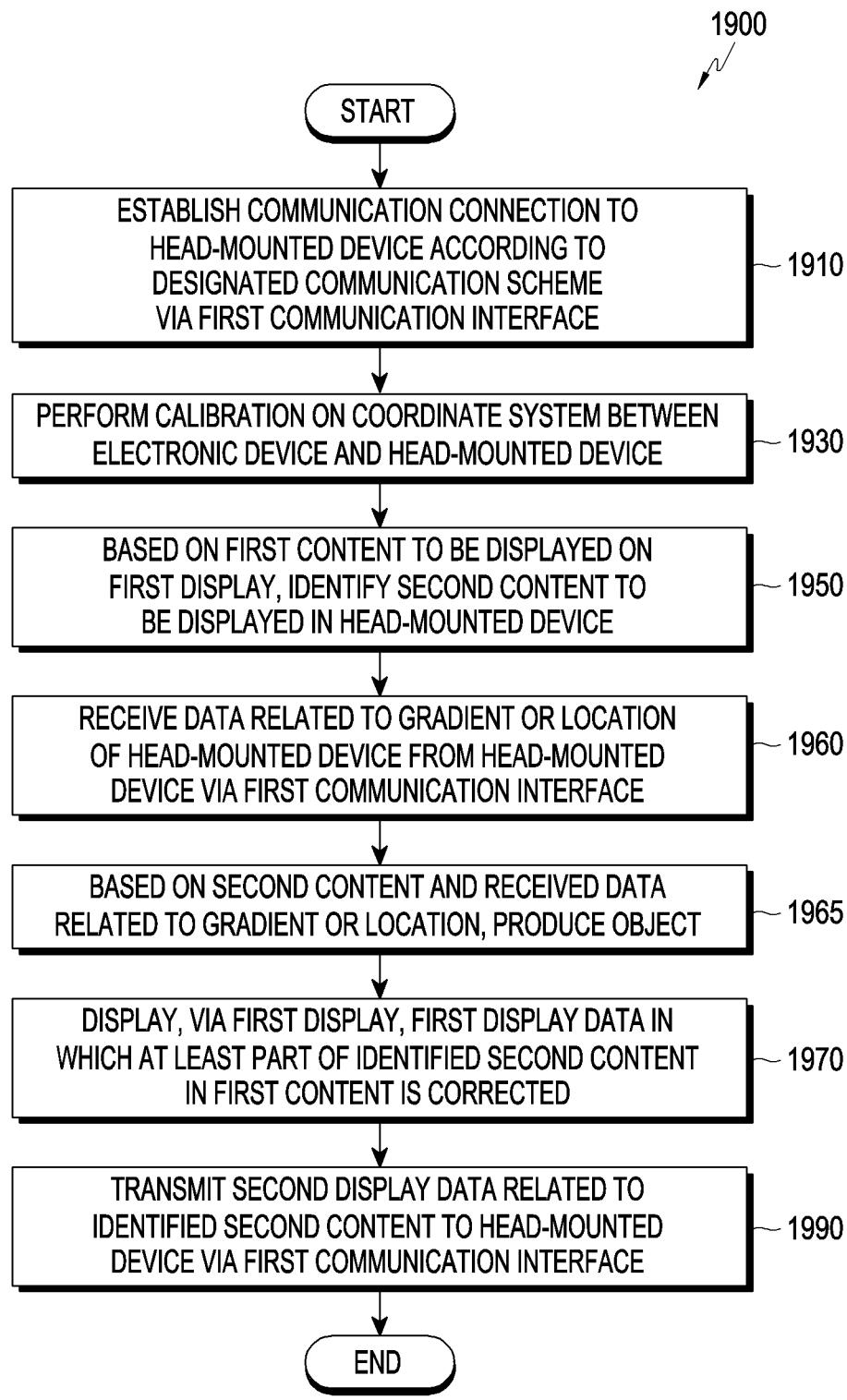
FIG. 19 is a flowchart illustrating a method of operating an electronic device according to an embodiment of the disclosure.

FIG. 19 is a flowchart 1900 illustrating a method of operating an electronic device according to an embodiment of the disclosure.

Referring to FIG. 19, the electronic device 101 according to an embodiment of the disclosure may establish a communication connection to the head-mounted device 200 and 300 according to a designated communication scheme via the first communication interface 430 in operation 1910.

In operation 1930, the electronic device 101 according to an embodiment may perform calibration on a coordinate system between the electronic device 101 and the head-mounted device 200 and 300.

In operation 1950, based on a first content (C1) to be displayed on the first display 440, the electronic device 101 according to an embodiment may identify a second content (C2) to be displayed in the head-mounted device 200 and 300.

In operation 1960, the electronic device 101 according to an embodiment may receive data related to a gradient or location of the head-mounted device 200 and 300 from the head-mounted device 200 and 300 via the first communication interface 430.

In operation 1965, based on the second content (C2) and the received data related to the gradient or location, the electronic device 101 according to an embodiment may produce an object (O). Here, the produced object (O) may be an object displayed on the display member 201 of the head-mounted device 200 and 300 via the second display 540. According to an embodiment of the disclosure, the electronic device 101 may determine at least one of a displaying size, a displaying location, or a displaying form of the object (O), and may produce the object (O) based thereon.

In operation 1970, the electronic device 101 according to an embodiment may display, on the first display 440, first display data in which at least part of the second content (C2) identified in the first content (C1) is corrected.

In operation 1990, the electronic device 101 according to an embodiment of the disclosure may transmit second display data related to the identified second content (C2) to the head-mounted device 200 and 300 via the first communication interface 430. According to an embodiment of the disclosure, the electronic device 101 may transmit the object (O) produced to correspond to the second content (C2) in operation 1965 to the head-mounted device 200 and 300.

Figure 20:
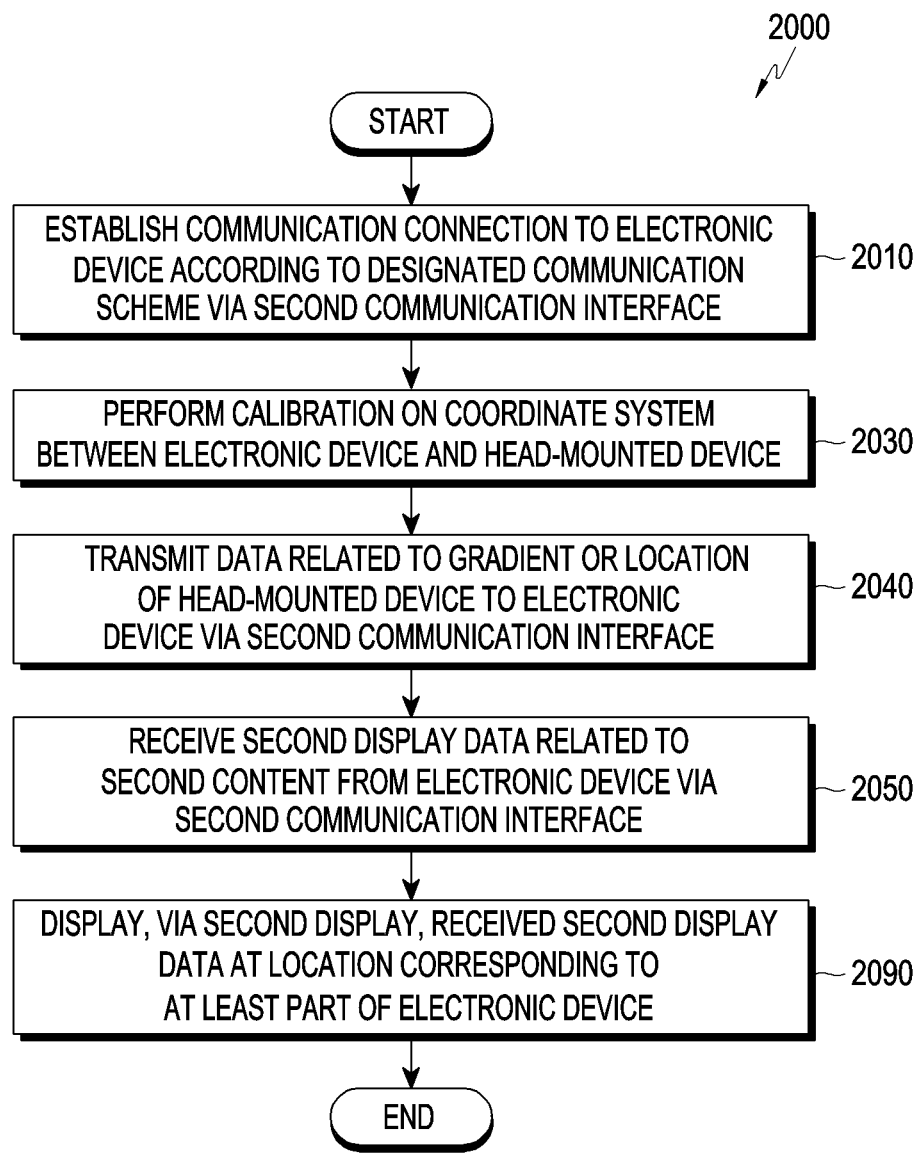
FIG. 20 is a flowchart illustrating a method of operating a head-mounted device according to an embodiment of the disclosure.

FIG. 20 is a flowchart 2000 illustrating a method of operating a head-mounted device according to an embodiment of the disclosure.

Referring to FIG. 20, in operation 2010, the head-mounted device according to an embodiment may establish a communication connection to the electronic device 101 according to a designated communication scheme via the second communication interface 530.

In operation 2030, the head-mounted device 200 and 300 according to an embodiment may perform calibration on a coordinate system between the electronic device 101 and the head-mounted device 200 and 300.

In operation 2040, the head-mounted device 200 and 300 according to an embodiment may transmit data related to a gradient or location of the head-mounted device 200 and 300 to the electronic device 101 via the second communication interface 530.

In operation 2050, the head-mounted device 200 and 300 according to an embodiment may receive second display data related to a second content (C) from the electronic device 101 via the second communication interface 530.

In operation 2090, the head-mounted device 200 and 300 according to an embodiment may display, via the second display 540, the received second display data at a location corresponding to at least part of the electronic device 101. According to an embodiment of the disclosure, the head-mounted device 200 and 300 may display an object (O) corresponding to the second display data in display member 201 via the second display 540.

The electronic device 101 according to an embodiment of the disclosure may include the first communication interface 430 and the communication module 190, the first display 440 and the display module 160, and the first processor 410 and the processor 120. The first processor 410 and the processor 120 may be configured to establish a communication connection to the head-mounted device 200 and 300 according to a designated communication scheme through the first communication interface 430 and the communication module 190. The first processor 410 and the processor 120 may be configured to identify, based on a first content (C1) to be displayed on the first display 440 and the display module 160, a second content (C2) to be displayed in the head-mounted device 200 and 300. The first processor 410 and the processor 120 may be configured to display, on the first display 440 and the display module 160 based on identifying of the second content (C2), first display data in which at least part of the identified second content (C2) in the first content (C1) is corrected. The first processor 410 and the processor 120 may be configured to transmit second display data related to the identified second content (C2) to the head-mounted device 200 and 300 through the first communication interface 430 and the communication module 190.

In the electronic device 101 according to an embodiment of the disclosure, the first processor 410 and the processor 120 may be configured to identify, based on an executed application, the second content (C2) included in the first content (C1), as at least part of the operation of identifying the second content (C2).

In the electronic device 101 according to an embodiment of the disclosure, the first processor 410 and the processor 120 may be configured to identify, based on a trigger signal corresponding to an input or an environment of the electronic device 101, the second content (C2) included in the first content (C1), as at least part of the operation of identifying the second content (C2).

In the electronic device 101 according to an embodiment of the disclosure, the first processor 410 and the processor 120 may be configured to display, on the first display 440 and the display module 160, the first display data corresponding to a screen in which the second content (C2) is hidden in the first content (C1) so that the second content (C2) is not displayed on the first display 440 and the display module 160, as at least part of the operation of displaying the first display data on the first display 440 and the display module 160.

In the electronic device 101 according to an embodiment of the disclosure, the first processor 410 and the processor 120 may be configured to perform, based on establishing the communication connection according to the designated communication scheme, calibration on a coordinate system of the electronic device 101 and a coordinate system of the head-mounted device 200 and 300.

In the electronic device 101 according to an embodiment of the disclosure, the first processor 410 and the processor 120 may be configured to transmit, to the head-mounted device 200 and 300, the second display data in which a location of at least one button included in the second content (C2) is changed, as at least part of the operation of transmitting the second display data to the head-mounted device 200 and 300.

In the electronic device 101 according to an embodiment of the disclosure, the first processor 410 and the processor 120 may be configured to transmit a display attribute including at least one of a displaying size, a displaying location, or a displaying form of an object (O) corresponding to the second content (C2), as at least part of the operation of transmitting the second display data to the head-mounted device 200 and 300.

In the electronic device 101 according to an embodiment of the disclosure, the first processor 410 and the processor 120 may be configured to receive, based on identifying of the second content (C2), data related to a location or a gradient of the head-mounted device 200 and 300 from the head-mounted device 200 and 300 through the first communication interface 430 and the communication module 190. The first processor 410 and the processor 120 may be configured to produce an object (O) based on the second content (C2) and the received data related to the location or the gradient. The first processor 410 and the processor 120 may be configured to transmit data related to the produced object (O) to the head-mounted device 200 and 300, as at least part of the operation of transmitting the second display data to the head-mounted device 200 and 300.

In the electronic device 101 according to an embodiment of the disclosure, the first processor 410 and the processor 120 may be configured to identify, based on the received data related to the location or gradient, a relative gradient between the electronic device 101 and the head-mounted device 200 and 300. The first processor 410 and the processor 120 may be configured to transmit the second display data to the head-mounted device 200 and 300 in case that the identified relative gradient falls within a designated threshold range.

A method of operating the electronic device 101 according to an embodiment of the disclosure may include operation 1710 and 1910 of establishing a communication connection to the head-mounted device 200 and 300 according to a designated communication scheme through the first communication interface 430 and the communication module 190. The method of the electronic device 101 according to an embodiment may include operation 1750 and 1950 of identifying, based on a first content (C1) to be displayed on the first display 440 and the display module 160, a second content (C2) to be displayed in the head-mounted device 200 and 300. The method of the electronic device 101 according to an embodiment may include operation 1770 and 1970 of displaying, on the first display 440 and the display module 160 based on identifying of the second content (C2), first display data in which at least part of the identified second content (C2) in the first content (C1) is corrected. The method of the electronic device 101 according to an embodiment may include operation 1780 and 1990 of transmitting second display data related to the identified second content (C2) to the head-mounted device 200 and 300 through the first communication interface 430 and the communication module 190.

In the method of operating the electronic device 101 according to an embodiment of the disclosure, operation 1750 and 1950 of identifying the second content (C2) may identify, based on an executed application, the second content (C2) included in the first content (C1).

In the method of operating the electronic device 101 according to an embodiment of the disclosure, operation 1750 and 1950 of identifying the second content (C2) may identify, based on a trigger signal corresponding to an input or an environment of the electronic device (101), the second content (C2) included in the first content (C1).

In the method of operating the electronic device 101 according to an embodiment of the disclosure, operation 1770 and 1970 of displaying the first display data on the first display 440 and the display module 160 may display, on the first display 440 and the display module 160, the first display data corresponding to a screen in which the second content (C2) is hidden in the first content (C1) so that the second content (C2) is not displayed on the first display 440 and the display module 160.

The method of operating the electronic device 101 according to an embodiment of the disclosure may further include operation 1730 and 1930 of performing, based on establishing of the communication connection according to the designated communication scheme, calibration on a coordinate system of the electronic device 101 and a coordinate system of the head-mounted device 200 and 300.

In the method of operating the electronic device 101 according to an embodiment of the disclosure, operation 1780 and 1990 of transmitting the second display data to the head-mounted device 200 and 300 may transmit, to the head-mounted device (200, 300), the second display data in which a location of at least one button included in the second content (C2) is changed.

The method of operating the electronic device 101 according to an embodiment may further include operation 1790 of transmitting, to the head-mounted device 200, 300, a display attribute including at least one of a displaying size, a displaying location, or a displaying form of an object (O) corresponding to the second content (C2).

The method of operating the electronic device 101 according to an embodiment may further include operation 1960 of receiving, based on identifying of the second content (C2), data related to a location or a gradient of the head-mounted device 200 and 300 from the head-mounted device 200 and 300 through the first communication interface 430 and the communication module 190. The operation method of the electronic device 101 according to an embodiment may further include operation 1965 of producing an object (O) based on the second content (C2) and the received data related to the location or the gradient. In the method of operating the electronic device 101 according to an embodiment of the disclosure, operation 1780 and 1990 of transmitting the second display data to the head-mounted device 200 and 300 may transmit the produced object (O) to the head-mounted device 200 and 300.

The memory 130 and the first memory 420 that stores one or more programs according to an embodiment of the disclosure may include operation 1710 and 1910 of establishing, based on execution of an application, a communication connection to the head-mounted device 200 and 300 according to a designated communication scheme through the first communication interface 430 and the communication module 190. The storage medium according to an embodiment may include operation 1750 and 1950 of identifying, based on a first content (C1) to be displayed on the first display 440 and the display module 160, a second content (C2) to be displayed in the head-mounted device 200 and 300. The storage medium according to an embodiment may include operation 1770 and 1970 of displaying, on the first display 440 and the display module 160 based on identifying of the second content (C2), first display data in which at least part of the identified second content (C2) in the first content (C1) is corrected. The storage medium according to an embodiment may include operation 1780 and 1990 of transmitting second display data related to the identified second content (C2) to the head-mounted device 200 and 300 through the first communication interface 430 and the communication module 190.

The head-mounted device 200 and 300 according to an embodiment of the disclosure may include the second communication interface 530 and the communication module 190, the second display 540 and the display module 160, and the second processor 510 and the processor 120. The second processor 510 and the processor 120 may be configured to establish a communication connection to the electronic device 101 according to a designated communication scheme through the second communication interface 530 and the communication module 190. The second processor 510 and the processor 120 may be configured to receive second display data related to a second content (C2) from the electronic device 101 through the second communication interface 530 and the communication module 190. The second processor 510 and the processor 120 may be configured to display, on the second display 540 and the display module 160, the received second display data at a location corresponding to at least part of the electronic device 101.

In the head-mounted device 200 and 300 according to an embodiment of the disclosure, the second processor 510 and the processor 120 may be configured to receive, from the electronic device (101), a display attribute including at least one of a displaying size, a displaying location, or a displaying form of an object (O) corresponding to the second content (C2). The second processor 510 and the processor 120 may be configured to produce, based on the received display attribute, an object (O) corresponding to the second display data.

In the head-mounted device 200 and 300 according to an embodiment of the disclosure, the second processor 510 and the processor 120 may be configured to transmit, based on establishing of the communication connection according to the designated communication scheme, data related to a location or a gradient of the head-mounted device 200 and 300 to the electronic device 101 through the second communication interface 530 and the communication module 190. The second processor 510 and the processor 120 may be configured to receive the object (O) produced based on the second content (C2) and the data related to the location or the gradient from the electronic device 101, as at least part of the operation of receiving the second display data.

A method of operating the head-mounted device 200 and 300 according to an embodiment of the disclosure may include operation 1810 and 2010 of establishing a communication connection to the electronic device 101 according to a designated communication scheme through the second communication interface 530 and the communication module 190. The method of operating the head-mounted device 200 and 300 according to an embodiment may include operation 1850 and 2050 of receiving second display data related to a second content (C2) from the electronic device 101 through the second communication interface 530 and the communication module 190. The method of operating the head-mounted device 200 and 300 according to an embodiment may include operation 1890 and 2090 of displaying, via the second display 540 and the display module 160, the received second display data at a location corresponding to at least part of the electronic device 101.

The second memory 520 and the memory 130 that stores one or more programs according to an embodiment of the disclosure may include operation 1810 and 2010 of establishing, based on execution of an application, a communication connection to the electronic device 101 according to a designated communication scheme through the second communication interface 530 and the communication module 190. The storage medium according to an embodiment may include operation 1850 and 2050 of receiving second display data related to a second content (C2) from the electronic device 101 through the second communication interface 530 and the communication module 190. The storage medium according to an embodiment may include operation 1890 and 2090 of displaying, on the second display 540 and the display module 160, the received second display data at a location corresponding to at least part of the electronic device 101.

The electronic device according to embodiments may be one of various types of electronic devices. The electronic devices may include, for example, a portable communication device (e.g., a smartphone), a computer device, a portable multimedia device, a portable medical device, a camera, an electronic device, or a home appliance. According to an embodiment of the disclosure, the electronic devices are not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments of the disclosure, each component (e.g., a module or a program) of the above-described components may include a single entity or multiple entities, and some of the multiple entities may be separately disposed in different components. According to embodiments of the disclosure, one or more of the above-described components may be omitted, or one or more other components may be added. Alternatively or additionally, a plurality of components (e.g., modules or programs) may be integrated into a single component. In such a case, according to embodiments of the disclosure, the integrated component may still perform one or more functions of each of the plurality of components in the same or similar manner as they are performed by a corresponding one of the plurality of components before the integration. According to embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication interface;
   a display; and
   at least one processor,
   wherein the at least one processor is configured to:
      establish, through the communication interface, a communication connection to a head-mounted device according to a designated communication scheme,
      identify, based on a first content (C1) to be displayed on the display, a second content (C2) to be displayed in the head-mounted device,
      display, on the display based on identifying of the second content (C2), first display data in which at least part of the identified second content (C2) in the first content (C1) is corrected, and transmit, through the communication interface, second display data related to the identified second content (C2) to the head-mounted device.

2. The electronic device of claim 1, wherein the at least one processor is further configured to identify, based on an executed application, the second content (C2) included in the first content (C1), as at least part of the identifying of the second content (C2).

3. The electronic device of claim 1, wherein the at least one processor is further configured to identify, based on a trigger signal corresponding to an input or an environment of the electronic device, the second content (C2) included in the first content (C1), as at least part of the identifying of the second content (C2).

4. The electronic device of claim 1, wherein the at least one processor is further configured to display, on the display, the first display data corresponding to a screen in which the second content (C2) is hidden in the first content (C1) so that the second content (C2) is not displayed on the display, as at least part of displaying of the first display data on the display.

5. The electronic device of claim 1, wherein the at least one processor is further configured to perform, based on establishing of the communication connection according to the designated communication scheme, calibration on a coordinate system of the electronic device and a coordinate system of the head-mounted device.

6. The electronic device of claim 1, wherein the at least one processor is further configured to transmit, to the head-mounted device, the second display data in which a location of at least one button included in the second content (C2) is changed, as at least part of transmitting of the second display data to the head-mounted device.

7. The electronic device of claim 1, wherein the at least one processor is further configured to transmit, to the head-mounted device, a display attribute including at least one of a displaying size, a displaying location, or a displaying form of an object (O) corresponding to the second content (C2), as at least part of transmitting of the second display data to the head-mounted device.

8. The electronic device of claim 1, wherein the at least one processor is further configured to:
receive, through the communication interface, based on the identifying of the second content (C2), data related to a location or a gradient of the head-mounted device from the head-mounted device,
produce an object (O) based on the second content (C2) and the received data related to the location or the gradient, and
transmit data related to produced object (O) to the head-mounted device, as at least part of transmitting of the second display data to the head-mounted device.

9. The electronic device of claim 8, wherein the at least one processor is further configured to:
identify, based on the received data related to the location or gradient, a relative gradient between the electronic device and the head-mounted device, and
transmit the second display data to the head-mounted device in case that the identified relative gradient falls within a designated threshold range.

10. A method of operating an electronic device, the method comprising:
establishing a communication connection to a head-mounted device according to a designated communication scheme via a communication interface;

identifying, based on a first content (C1) to be displayed on a display, a second content (C2) to be displayed in the head-mounted device;

displaying, on the display based on identifying of the second content (C2), first display data in which at least part of the identified second content (C2) in the first content (C1) is corrected; and transmitting, through the communication interface, second display data related to the identified second content (C2) to the head-mounted device.

11. The method of claim 10, wherein the identifying of the second content (C2) comprises identifying, based on an executed application, the second content (C2) included in the first content (C1).

12. The method of claim 10, wherein the identifying of the second content (C2) comprises identifying, based on a trigger signal corresponding to an input or an environment of the electronic device, the second content (C2) included in the first content (C1).

13. The method of claim 10, wherein the displaying of the first display data on the display comprises displaying, on the display, the first display data corresponding to a screen in which the second content (C2) is hidden in the first content (C1) so that the second content (C2) is not displayed on the display.

14. The method of claim 10, further comprising:
performing, based on the establishing of the communication connection according to the designated communication scheme, calibration on a coordinate system of the electronic device and a coordinate system of the head-mounted device.

15. The method of claim 10, wherein the transmitting of the second display data to the head-mounted device comprises transmitting, to the head-mounted device, the second display data in which a location of at least one button included in the second content (C2) is changed.

16. The method of claim 10, further comprising transmitting, to the head-mounted device, a display attribute including at least one of a displaying size, a displaying location, or a displaying form of an object (O) corresponding to the second content (C2).

17. The method of claim 10, further comprising:
receiving, through the communication interface, based on the identifying of the second content (C2), data related to a location or a gradient of the head-mounted device from the head-mounted device; and
producing an object (O) based on the second content (C2) and the received data related to the location or the gradient,
wherein the transmitting of the second display data to the head-mounted device comprises transmitting the produced object (O) to the head-mounted device.

18. A head-mounted device comprising:
a communication interface;
a display; and
at least one processor,
wherein the at least one processor is configured to:
establish, through the communication interface, a communication connection to an electronic device according to a designated communication scheme,
receive, through the communication interface, second display data related to a second content (C2) from the electronic device, and
display, on the display, the received second display data at a location corresponding to at least part of the electronic device.

19. The head-mounted device of claim 18, wherein the at least one processor is further configured to:
- receive, from the electronic device, a display attribute including at least one of a displaying size, a displaying location, or a displaying form of an object (O) corresponding to the second content (C2), and
- produce, based on the received display attribute, an object (O) corresponding to the second display data.

20. The head-mounted device of claim 18, wherein the at least one processor is further configured to:
- transmit, through the communication interface, based on establishing of the communication connection according to the designated communication scheme, data related to a location or a gradient of the head-mounted device to the electronic device, and
- receive an object (O) produced based on the second content (C2) and the data related to the location or the gradient from the electronic device, as at least part of receiving of the second display data.

* * * * *